United States Patent
Adler et al.

(10) Patent No.: US 9,895,630 B2
(45) Date of Patent: Feb. 20, 2018

(54) ALLOCATION MEASUREMENT SYSTEMS AND METHODS

(71) Applicant: Valin Corporation, Santa Ana, CA (US)

(72) Inventors: Jeffrey Adler, Westminster, CO (US); Steven Thomas Croft, San Jose, CA (US); Jared Micah Lanig, Williston, ND (US)

(73) Assignee: Valin Corporation, San Jose, CA (US)

( * ) Notice: Subject to any disclaimer, the term of this patent is extended or adjusted under 35 U.S.C. 154(b) by 256 days.

(21) Appl. No.: 14/752,601

(22) Filed: Jun. 26, 2015

(65) Prior Publication Data

US 2016/0008742 A1 Jan. 14, 2016

Related U.S. Application Data

(60) Provisional application No. 62/017,738, filed on Jun. 26, 2014.

(51) Int. Cl.
*B01D 19/00* (2006.01)
*G05D 7/06* (2006.01)
(Continued)

(52) U.S. Cl.
CPC ..... *B01D 19/0063* (2013.01); *B01D 17/0208* (2013.01); *B01D 17/0214* (2013.01);
(Continued)

(58) Field of Classification Search
CPC .... B01D 17/02; B01D 17/0214; B01D 19/00; B01D 19/0036; B01D 19/0063; G01F 15/08; G05D 9/12
(Continued)

(56) References Cited

U.S. PATENT DOCUMENTS 4,960,513 A * 10/1990 Young ............... B01D 17/0208
210/104
5,205,310 A * 4/1993 Kolpak ............. B01D 17/0214
137/172
(Continued)

FOREIGN PATENT DOCUMENTS

CN 202605785 12/2012
CN 102794033 7/2014
(Continued)

OTHER PUBLICATIONS

Ken Arnold and Maurice Stewart, "Surface Production Operations, vol. 1: Design of Oil Handling Systems and Facilities," Chapter 4, "Three-Phase Oil and Water Separators," Mar. 31, 2011, pp. 131-174, Elsevier Science.
(Continued)

*Primary Examiner* — Robert A Hopkins
(74) *Attorney, Agent, or Firm* — Knobbe Martens Olson Bear, LLP

(57) ABSTRACT

Systems and methods are provided for accurately measuring and allocating treated oil. Separators can be modified to include automatic control systems utilizing active flow controls and level sensors. The automatic control systems can be configured to cause oil to flow at a rate and with a duration sufficient to accurately measure the amount of oil transferred from the separator. The systems and methods also provide for a method of correcting for oil density variations. The systems and methods also allow for fail-safe operations by having the active flow controls fail in an open position allowing pre-existing passive flow control valves to operate normally.

8 Claims, 11 Drawing Sheets

(51) Int. Cl.
  *G05D 9/12* (2006.01)
  *G05D 27/02* (2006.01)
  *G01F 15/08* (2006.01)
  *B01D 17/02* (2006.01)
  *B01D 17/12* (2006.01)

(52) U.S. Cl.
  CPC .............. *B01D 17/12* (2013.01); *G01F 15/08* (2013.01); *G05D 7/0635* (2013.01); *G05D 9/12* (2013.01); *G05D 27/02* (2013.01)

(58) Field of Classification Search
  USPC ......... 95/241; 96/155, 156, 157, 158; 137/2, 137/172
  See application file for complete search history.

(56) References Cited

U.S. PATENT DOCUMENTS

| | | | |
|---|---|---|---|
| 7,531,099 | B1 | 5/2009 | Rhodes |
| 7,610,955 | B2 | 11/2009 | Irwin |
| 8,641,813 | B2 | 2/2014 | Gysling |
| 2009/0149969 | A1 | 6/2009 | Slupphaug et al. |
| 2012/0000643 | A1 | 1/2012 | Bruun et al. |
| 2012/0165995 | A1 | 6/2012 | Crawley et al. |
| 2012/0285896 | A1 | 11/2012 | Black |
| 2013/0032217 | A1 | 7/2013 | Pesek et al. |

FOREIGN PATENT DOCUMENTS

| | | |
|---|---|---|
| WO | WO 1997/024615 | 7/1997 |
| WO | WO 2013/032577 | 5/2014 |

OTHER PUBLICATIONS

"Two Phases Oil and Gas Separation Level Measurement," Apr. 27, 2012, available at: https://iqbalalal.wordpress.com/2012/04/27/twophasesoilandgasseparatorationlevelmeasurement/, printed Sep. 30, 2015, in 7 pages.

* cited by examiner

ALLOCATION MEASUREMENT SYSTEMS AND METHODS

CROSS-REFERENCE TO RELATED APPLICATIONS

This application claims priority to U.S. Prov. Pat. App'n No. 62/017,738, filed Jun. 26, 2014, entitled "Allocation Measurement Systems and Methods," which is incorporated by reference herein in its entirety.

BACKGROUND

Field

The present disclosure relates to oil separator systems and methods for allocation and measurement of separated oil and water.

Description of Related Art

The process of extracting oil from the ground in surface operations includes treating or separating the solution extracted from the ground into at least oil, water, and gas. The extracted solution can be fed into separators which work to separate the oil and water from the gas or to separate the solution into at least oil, water, and gas. The amount of oil, water, and gas extracted from a well site can be measured and tracked for a variety of reasons. The measurement can be used to keep operations running with effective production rates, to mitigate royalty payment disputes, and to help gain insight into issues in the treatment and separation of oil.

The measurement can also form the basis of a financial transaction between oil companies and royalty owners. The financial transaction that takes place between an oil company and a royalty owner can be based at least in part on terms in a signed lease. The landowner may collect a royalty payment based at least in part on the amount of product that is extracted and sold from the lease. Typically, a well site includes multiple wells, which may include different lease holders or lease agreements in place for each of the wells. Oil produced for the entire site may be aggregated into a battery of storage tanks for transfer to trucks or to a pipeline. Payments to an individual lease holder can be based on a production rate of each specific well where the measurement is performed periodically (e.g., monthly) combined with periodic measurements of production of other wells at the well site. A corresponding percentage of total site output may then be allocated to each well based on these periodic measurements.

Acquiring measurement data typically includes connecting a well to a separator and connecting the output of the separator to a storage tank. Workers can then manually measure the oil level in the tank before and after a specified time interval and use the difference in height to calculate flow for the well.

SUMMARY

The systems, methods and devices of the disclosure each have innovative aspects, no single one of which is indispensable or solely responsible for the desirable attributes disclosed herein. Some of the advantageous features of some embodiments will now be summarized.

In a first aspect, an oil separator system configured to allocate and measure separated oil and water is provided that includes a two-phase separator, a three-phase separator, and a separator control system. The two-phase separator is coupled to the three-phase separator such that an emulsion comprising oil and water can flow between the two-phase separator and the three-phase separator. The two-phase separator comprises a liquid level sensor configured to determine a level of liquid in the two-phase separator. The two-phase separator further comprises a liquid flow control valve configured to control a flow of liquid from the two-phase separator to the three-phase separator. The separator control system is configured to receive data from the liquid level sensor and adjust (e.g., close, open fully, open a fraction of the way, etc.) the liquid flow control valve based at least in part on the data received from the liquid level sensor. The three-phase separator comprises an oil level sensor, an oil flow control, a water level sensor, a water flow control, and an oil flow measurement system configured to measure a flow of oil from the three-phase separator to an oil storage. The separator control system is configured to receive data from the water level sensor and adjust the water flow control valve based at least in part on the data received from the water level sensor. The separator control system is configured to receive data from the oil level sensor and to adjust the oil flow control valve based at least in part on the data received from the oil level sensor. The separator control system is further configured to adjust the flow control valve to achieve an oil flow rate within a targeted range wherein the targeted range comprises a range of oil flow rates at which the oil flow measurement system provides an oil flow measurement within a targeted uncertainty.

In some embodiments of the first aspect, the oil separator system further comprises a water flow measurement system configured to measure a flow of water from the three-phase separator to a water storage. In some embodiments of the first aspect, the separator control system is further configured to maintain an oil level in the three-phase separator above an oil level threshold so that a mechanical valve remains open. In some embodiments of the first aspect, the separator control system is further configured to maintain a water level in the three-phase separator above a water level threshold so that a mechanical valve remains open. In some embodiments of the first aspect, the separator control system is further configured to maintain a liquid level in the two-phase separator above a liquid level threshold so that a mechanical valve remains open. In some embodiments of the first aspect, the oil separator system further comprises a bridle coupled to the three-phase separator, the bridle configured to house oil and water in a manner which reduces turbulence of the oil and water. The bridle may be configured to house the water level sensor. In some embodiments of the first aspect, the water level sensor, the oil level sensor, and/or the liquid level sensor comprise a differential pressure sensor. In some embodiments of the first aspect, the water level sensor, the oil level sensor, and/or the liquid level sensor comprise a capacitance sensor and/or probe. In some embodiments of the first aspect, the oil flow measurement system and/or the water flow measurement system comprises a Coriolis flow meter.

In a second aspect, a two-phase separator is retrofit to include automatic control systems, the two-phase separator including a tank configured to store gas and a mixture of oil and water. The two-phase separator also includes an inlet pipe configured to receive a mixture of gas, oil and water and deposit the mixture into the tank. The two-phase separator also includes a gas outlet pipe configured to carry separated gas from the tank. The two-phase separator also includes a liquid outlet pipe configured to carry separated liquid from the tank, the separated liquid comprising a mixture of oil and water. The two-phase separator also includes a liquid level sensor configured to acquire measurements corresponding to a level of the separated liquid in the tank. The two-phase separator also includes a mechanical valve configured to open when the separated liquid is above a first liquid level and to close when the separated liquid is below a second liquid level, the second liquid level lower than the first liquid level. The two-phase separator also includes a liquid flow control comprising an actuatable valve coupled to a separator control system. The separator control system is configured to receive data from the liquid level sensor to control the liquid flow control, wherein the separator control system is configured to maintain the liquid level above the first liquid level during operation.

In some embodiments of the second aspect, the liquid level sensor comprises a differential pressure transmitter. In some embodiments of the second aspect, the actuatable valve comprises an electrically or pneumatically actuated valve. In some embodiments of the second aspect, the liquid level sensor, the liquid flow control, and the separator control system are added to an existing two-phase separator to add automatic control capabilities to the two-phase separator. In some embodiments of the second aspect, the separator control system controls the liquid flow control using a feedback loop that determines whether to adjust the liquid flow control based at least in part on data received in real-time from the liquid level sensor and data previously received from the liquid level sensor. In some embodiments of the second aspect, the liquid flow control is configured to remain open when the separator control system or the liquid flow control is in an error or failure condition.

In a third aspect, a three-phase separator is retrofit to include automatic control systems, the three-phase separator including a tank configured to store gas, oil and water. The three-phase separator also includes an inlet pipe configured to receive a mixture of gas, oil and water and deposit the mixture into the tank. The three-phase separator also includes a gas outlet pipe configured to carry separated gas from the tank. The three-phase separator also includes an oil outlet pipe configured to carry separated oil from the tank. The three-phase separator also includes a water outlet pipe configured to carry separated water from the tank. The three-phase separator also includes an oil level sensor configured to acquire measurements corresponding to a level of the separated oil in the tank. The three-phase separator also includes a mechanical valve configured to open when the separated oil is above a first oil level and to close when the separated oil is below a second oil level, the second oil level lower than the first oil level. The three-phase separator also includes an oil flow control comprising an actuatable valve coupled to a separator control system. The three-phase separator also includes an oil flow measurement system configured to acquire measurements corresponding to a flow of oil from the tank. The separator control system is configured to receive data from the oil level sensor to control the oil flow control, wherein the separator control system is configured to maintain the oil level above the first oil level during operation.

In some embodiments of the third aspect, the oil level sensor comprises a differential pressure transmitter. In some embodiments of the third aspect, the actuatable valve comprises an electrically or pneumatically actuated valve. In some embodiments of the third aspect, the oil level sensor, the oil flow control, and the separator control system are added to an existing three-phase separator to add automatic control capabilities to the three-phase separator. In some embodiments of the third aspect, the separator control system controls the oil flow control using a feedback loop that determines how to adjust the oil flow control based at least in part on data received in real-time from the oil level sensor and data previously received from the oil level sensor. In some embodiments of the third aspect, the oil flow control is configured to remain open when at least one of the separator control system or the oil flow control is in an error or failure condition. In some embodiments of the third aspect, the separator control system is further configured to adjust the oil flow control to achieve an oil flow rate within a targeted range wherein the targeted range comprises a range of oil flow rates at which the oil flow measurement system provides an oil flow measurement within a targeted uncertainty. In some embodiments of the third aspect, the separator control system is further configured to adjust the oil flow control based at least in part on data received from the oil flow measurement system.

In some embodiments of the third aspect, the three-phase separator further includes a water level sensor and a water flow control comprising an actuatable valve. In some embodiments of the third aspect, the three-phase separator further includes a water flow measurement system configured to measure a flow of water from the tank. In some embodiments of the third aspect, the separator control system is configured to receive data from the water level sensor to control the water flow control, wherein the separator control system is configured to maintain the water level above a threshold water level during operation.

In a fourth aspect, a separator control system configured to control a flow of gas and liquid in a separator is provided that includes a hardware processor in communication with a liquid level sensor, a flow control, and a flow measurement system, wherein the hardware processor is configured to execute computer-executable instructions to at least receive liquid level sensor data from the liquid level sensor and flow measurement data from the flow measurement system and adjust the flow control based at least in part on the received liquid level data and the flow data. The separator control system is further configured to control a flow of liquid such that the flow rate is within a targeted flow rate range, the targeted flow rate range configured such that measurements derived from the flow data are within a targeted uncertainty. The separator control system is further configured to maintain a liquid level above a liquid level threshold, the liquid level threshold configured such that the separator control system controls a mechanical valve configured to control liquid flow to remain open when the liquid level is above the liquid level threshold.

In some embodiments of the fourth aspect, the separator control system is configured to determine an oil density and adjust control of the flow control based at least in part on the oil density. In a further embodiment of the fourth aspect, the oil density is provided by the flow measurement system. In a further embodiment of the fourth aspect, the flow measurement system comprises a Coriolis flow meter. In some embodiments of the fourth aspect, the flow control comprises a ball valve. In a further embodiment, the separator control system is configured to open and close the ball valve to clean the valve. In some embodiments of the fourth aspect, the separator control system is configured to generate a notification or alarm when the liquid level exceeds a liquid level alarm threshold. In some embodiments of the fourth aspect, the separator control system is configured to open the flow control to flush a liquid outlet pipe.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

The systems and methods described herein provide for accurate measurement and monitoring of the amounts of oil, water and gas extracted and processed at a well site. These systems and methods can provide a stream of data to support oil extraction operations and financial considerations such as royalty payments. By increasing measurement accuracy, the systems and methods can advantageously result in more efficient well operation, fewer royalty payment disputes, and a firm basis for the financial transaction.

In some oil separation units, unreliable and/or inaccurate measurement systems and methods may lead to disadvantageous consequences which can include, for example, unnecessary waste, poor oil separation, errors in field processing, reduced product quality and danger to individual users. The systems and methods described herein can be used to retrofit such separation units to increase the accuracy, timeliness, and reliability of measurements associated with the treatment of oil. Accordingly, these systems and methods can be used to improve existing separation units by adding appropriate hardware in communication with a separation control unit to update the control and measurement methods to increase measurement accuracy, timeliness, and reliability. Such accurate, timely, and reliable measurements may increase the efficacy of well site management by allowing users to adjust control parameters to maintain productivity and quality. Timely measurements can advantageously provide early insight into potential or existing oil production problems, allowing for corrective action to be taken before a major disruption occurs. Accurate control and measurement systems and methods advantageously provide for more precise separation and measurement of oil and water at the well site. This can reduce the amount of oil and water that goes through the processing system without being properly accounted for.

Oil Separation System

Figure 1:
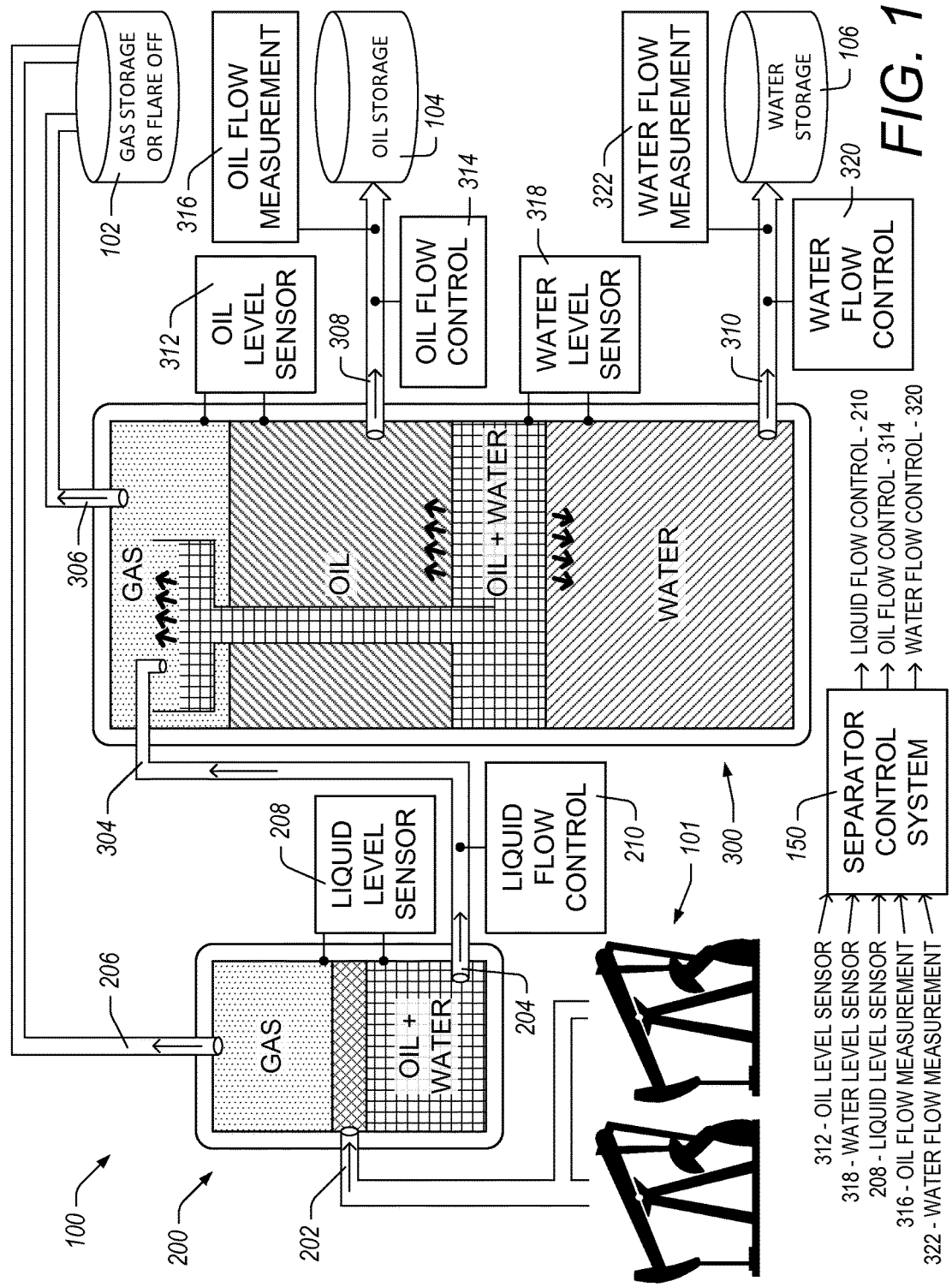
FIG. 1 illustrates a diagram of example oil separators comprising level controls, flow controls, and measurement systems.

FIG. 1 illustrates a diagram of an embodiment of an oil separation system 100 comprising a two-phase separator 200 and a three-phase separator 300 that include level controls, flow controls, and measurement systems. The oil separation system 100 includes a separator control system 150 configured to receive data from sensors, measurement systems, and controls; to analyze the data; and to control the flow of fluids based at least in part on the analyzed data. The oil separation system 100 includes gas storage 102, oil storage 104, and water storage 106 configured to respectively store gas, oil and water output from the two-phase separator 200 and the three-phase separator 300. In some embodiments, the gas from the two-phase separator 200 and the three-phase separator 300 is not stored in the gas storage 102 but is flared off.

The oil separation system 100 is configured for the treatment of oil to separate out water, gas, and oil. The oil separation system 100 includes the two-phase separator 200 that receives oil mixed with gas and water and the three-phase separator 300 that receives oil mixed with water and gas, but with a substantial amount of gas removed. The combination of the two-phase separator 200 and the three-phase separator 300 is configured to separate out the oil from the mixture. Specifically, the two-phase separator 200 separates gas from liquid (e.g., the liquid comprises a mixture of oil and water). The three-phase separator 300 separates gas, oil, and water. In some embodiments, the oil separation system 100 can be configured to include the three-phase separator 300 and exclude the two-phase separator 200. In some embodiments, the oil separation system 100 can include a plurality of the two-phase separator 200 and/or the three-phase separator 300. The three-phase separator 300 includes horizontal and vertical separators and structures also known as heater treaters.

In use, the oil separation system 100 is configured such that live crude oil flows from one or more wells 101 into the two-phase separator 200 and the liquid from the two-phase separator 200 then flows into the three-phase separator 300. In this process flow, the three-phase separator 300 removes some gas from the liquid mixture received from the two-phase separator 200 as the two-phase separator 200 generally does not completely remove all gas from the oil and water mixture. The three-phase separator 300 generally houses the mixture for a relatively long period of time so that there is sufficient time to separate the oil from the gas and water. In some embodiments, the three-phase separator 300 can use heat to speed up the process of separating the oil from the water, sometimes referred to as a heater treater.

Many oil separator systems rely on passive valves to keep the oil, water, and gas levels at desired levels within the separators. In such structures, when the pressure of the oil or water in the separator exceeds a valve-open threshold value, a valve will open up to allow the oil or water to flow until the pressure goes below a valve-close threshold value. The three-phase separator 300 and two-phase separator 200 of the oil separation system 100 include actively controlled valves (e.g., electronic and/or pneumatic valves) in addition to or in place of passive valves. In some embodiments, the three-phase separator 300 and two-phase separator 200 of the oil separation system 100 can be retrofit to include active valves in addition to existing passive valves. The separator control system 150 includes control algorithms to decide when to open and close the actively controlled valves. The separator control system 150 can include static control algorithms and/or feedback control algorithms.

The two-phase separator 200 is a vessel configured to receive a mix of fluids from one or more wells. The mixture enters the two-phase separator 200 through the two-phase separator inlet 202, where it is stored for a period of time. Due at least in part to the specific gravity of each of the gas and liquid mixture, the two-phase separator 200 separates the received fluids into gas and an oil emulsion (e.g., a mixture of oil and water). The two-phase separator 200 can be a vertical, horizontal, spherical separator, or any suitable separator. The two-phase separator 200 is configured to allow the gas to leave the vessel through a two-phase separator gas outlet 206. In some embodiments, the two-phase separator 200 includes a mist extractor to remove small liquid droplets from the gas. The two-phase separator 200 is configured to transfer the oil emulsion from the vessel by way of a two-phase separator liquid outlet 204. Generally, the two-phase separator gas outlet 206 is at or near a top of the vessel and the two-phase separator liquid outlet 204 is at or near a bottom of the vessel. The two-phase separator 200 includes a liquid level sensor 208 configured to measure properties of the liquid that correspond to a level of the liquid in the vessel. For example and without limitation, the liquid level sensor 208 can include one or more pressure sensors, a differential pressure transmitter, capacitance probes, or any combination of these or the like. The two-phase separator 200 includes a liquid flow control 210 configured to regulate the flow of liquids out of the two-phase separator 200. The separator control system 150 can be configured to receive measurement data from the liquid level sensor 208 and control the liquid flow control 210 based at least in part on the received measurement data.

The three-phase separator 300 is a vessel configured to receive an oil emulsion (e.g., from a two-phase separator) or other mixture of oil, gas, and water (e.g., from a well or other source) and separate the received oil emulsion into oil, water, and gas. The oil emulsion enters the three-phase separator 300 through the three-phase separator inlet 304, where it is stored for a period of time. Due at least in part to the specific gravities of the constituent parts, the mixture separates into oil, gas, and water. In some embodiments, the separation process can be aided by heat being applied to the mixture, such as in a heater treater. The three-phase separator 300 can be a vertical, horizontal, spherical separator, or any suitable separator. Upon entering the three-phase separator 300 through the three-phase separator inlet 304, gas can be released from the mixture. The mixture can descend into the vessel where the remaining water and oil separate.

The three-phase separator 300 includes a three-phase separator gas outlet 306 configured to allow gas to be transferred from the vessel to the gas storage 102 or to be flared off In some embodiments, the flow of gas through the three-phase separator gas outlet 306 can be controlled through a gas flow control.

The three-phase separator 300 includes a three-phase separator oil outlet 308 configured to allow treated oil to be transferred from the three-phase separator 300 to the oil storage 104. The three-phase separator 300 includes an oil level sensor 312 configured to measure properties of the oil that correspond to a level of the treated oil in the vessel. For example and without limitation, the oil level sensor 312 can include one or more pressure sensors, a differential pressure transmitter, capacitance probes, or any combination of these or the like. The three-phase separator 300 includes an oil flow control 314 configured to regulate the flow of oil out of the three-phase separator 300. The separator control system 150 can be configured to receive measurement data from the oil level sensor 312 and control the oil flow control 314 based at least in part on the received measurement data. The three-phase separator 300 includes an oil flow measurement 316 configured to measure a flow and/or flow rate of the oil from the vessel through the three-phase separator oil outlet 308. The oil flow measurement 316 can include any measurement system configured to determine a flow or flow rate of a liquid. For example, the oil flow measurement 316 can include a turbine or Coriolis flow meter. The separator control system 150 can be configured to receive flow measurement data from the oil flow measurement 316. The separator control system 150 can be further configured to adjust the oil flow control 314 based at least in part on the data received from the oil flow measurement 316.

The three-phase separator 300 includes a three-phase separator water outlet 310 configured to allow water to be transferred from the three-phase separator 300 to the water storage 106. The three-phase separator 300 includes a water level sensor 318 configured to measure properties of the water that correspond to a level of the water in the vessel. For example and without limitation, the water level sensor 318 can include one or more pressure sensors, a differential pressure transmitter, capacitance probes, or any combination of these or the like. The three-phase separator 300 includes a water flow control 320 configured to regulate the flow of water out of the three-phase separator 300. The separator control system 150 can be configured to receive measurement data from the water level sensor 318 and control the water flow control 320 based at least in part on the received measurement data. The three-phase separator 300 includes a water flow measurement 322 configured to measure a flow and/or flow rate of the water from the vessel through the three-phase separator water outlet 310. The water flow measurement 322 can include any measurement system configured to determine a flow or flow rate of a liquid. For example, the water flow measurement 322 can include a turbine or Coriolis flow meter. The separator control system 150 can be configured to receive flow measurement data from the water flow measurement 322. The separator control system 150 can be further configured to adjust the water flow control 320 based at least in part on the data received from the water flow measurement 322.

The separator control system 150 can be configured to control the dumping of treated oil and/or water using a feedback control loop which uses pressure measurements from the oil level sensor 312 and/or the water level sensor 318 to decide when to open and close the oil flow control 314 and/or the water flow control 320. The feedback control loop can be configured to open and close the oil flow control 314, for example, so that the dumped oil flows at a rate that is high enough so that the oil flow measurement 316 (e.g., a turbine or Coriolis meter) in the three-phase separator oil outlet 308 provides an accurate reading of the amount of oil dumped during that open/close cycle of the oil flow control 314. The control loop can be implemented using a programmable logic circuit which uses feedback control algorithms in real time to decide when to open and close the oil flow control 314 and/or the water flow control 320. The decision to close the oil flow control 314 and/or the water flow control 320 can be based at least in part on a predicted liquid height in the vessel so that the oil flow control 314 and/or the water flow control 320 will close prior to any gas entering the three-phase separator oil outlet 308 and/or the three-phase separator water outlet 310. The feedback control loop can utilize measurements and/or data from the oil level sensor 312, the oil flow measurement 316, the oil flow control 314, the water level sensor 318, the water flow measurement 322, and/or the water flow control 320.

In some embodiments, the liquid flow control 210, the oil flow control 314 and/or the water flow control 320 comprise electrically or pneumatically actuated ball valves to control flow of the oil/water emulsion, oil, and water. In some embodiments, one or more of the separators in the of separation system 100 can be retrofit to include the liquid flow control 210, the oil flow control 314, and/or the water flow control 320 to replace or supplement existing mechanical or passive valves (e.g., diaphragm valves) that are mechanically actuated by pressure or liquid level. The ball valves can advantageously provide self-cleaning capabilities. For example, oil comes out of the ground mixed with salty brine (e.g., 20% salt or higher) that can lead to build up of solid salts in the seats of some valves that may prevent the valves from shutting off completely. The ball valves apply a wiping action to the valve seats when they close. The wiping action can reduce or remove salt deposits from the valves. In some embodiments, the separator control system 150 can be configured to periodically, regularly, or intermittently perform close/open cycles on ball valves to reduce a likelihood that salt deposits accumulate on the valves.

Where separators are retrofit to include active valves, as described herein, the active valves (e.g., the oil flow control 314, the water flow control 320, and/or the liquid flow control 210) can be configured to set to be open in the event of an error or failure in the system. By being configured to fail open, the retrofit separators can continue to function with the passive valves that existed prior to the retrofit being installed on the separator because the open active valves do not significantly hinder the flow of fluids when fully open.

The oil separation system 100 can be configured to provide measurements with relatively high accuracy and reliability due at least in part to the flow measurement systems (e.g., the oil flow measurement 316, the water flow measurement 322, and/or a liquid flow measurement). In some embodiments, the flow measurement systems include a Coriolis meter. A Coriolis meter may be advantageous for providing accurate measurements due at least in part to a Coriolis meter having no moving parts within the fluid stream being measured. In some embodiments, the flow measurement system can be configured to measure flow and fluid density. For example, a Coriolis meter in the oil flow measurement 316 can be configured to measure the flow rate and the density of the treated oil.

The oil separation system 100 can be configured to provide measurements with relatively high accuracy and reliability due at least in part to the level sensors (e.g., the oil level sensor 312, the water level sensor 318, and/or the liquid level sensor 208). In some embodiments, the level sensors include capacitance probes configured to measure a height of an interface between water and oil, for example. In some embodiments, the level sensors include differential pressure transmitters configured to measure pressure below and above a liquid/gas interface to measure a liquid level.

The oil separation system 100 can be configured to provide measurements with relatively high accuracy and reliability due at least in part to the flow control valves (e.g., the oil flow control 314, the water flow control 320, and/or the liquid flow control 210). The control valves can be configured to adjust through a range of open and closed such that the flow rate of liquid through their corresponding outlets (e.g., pipes) is within a targeted flow rate range. The targeted flow rate range can be a range of flow rates at which the flow measurement system provides an uncertainty on a measured flow rate, the uncertainty being less than a targeted uncertainty. For example, the oil flow control 314 can be configured to allow oil to flow in the three-phase separator oil outlet 308 at a rate such that the uncertainty in the flow measured by the oil flow measurement 316 is less than a targeted value (e.g., less than 20% uncertainty, less than 15% uncertainty, less than 10% uncertainty, less than 5% uncertainty, or less than 1% uncertainty). In some embodiments, the flow control valves are configured to reduce or minimize disruptions to the flow of a fluid from a vessel which can reduce or minimize disruptions to the separation process caused, in some instances, by irregular flows.

The oil separation system 100 can be configured to provide measurements with relatively high accuracy and reliability due at least in part to the control of the system by the separator control system 150. The separator control system 150 can include a programmable logic controller, a single loop controller, or the like configured to automate control of the oil separation system 100, to capture measurement and production information at operation sites, and to create operational improvements related to monitoring of liquid flow rates and liquid deposit or dump quantities (e.g., the quantity of fluid deposited in a storage, such as the amount of oil deposited in the oil storage 104). In some embodiments, the separator control system 150 is configured to provide an interface that enables a user to view system status and process measurements in real time, including control valve status, valve position, tank fluid levels, tank and pipe pressures, and the like. The interface may also enable a user to make adjustments to the oil separation system 100 to maintain or improve fluid separation efficiency and production quality. The separator control system 150 can be configured to save data at frequent intervals. The saved data can be accessible by other systems and users to allow monitoring of past and current performance of the oil separation system 100. The data can also be used to provide current and total output values for oil, water, and/or gas. In some embodiments, the separator control system 150 is communicatively coupled to a supervisory control and data acquisition system that can also be connected to other wells and/or well sites. The separator control system 150 can also be configured to provide alarm messages and/or notifications to alert operators of process or control problems in real time.

Separator Control System

Figure 2:
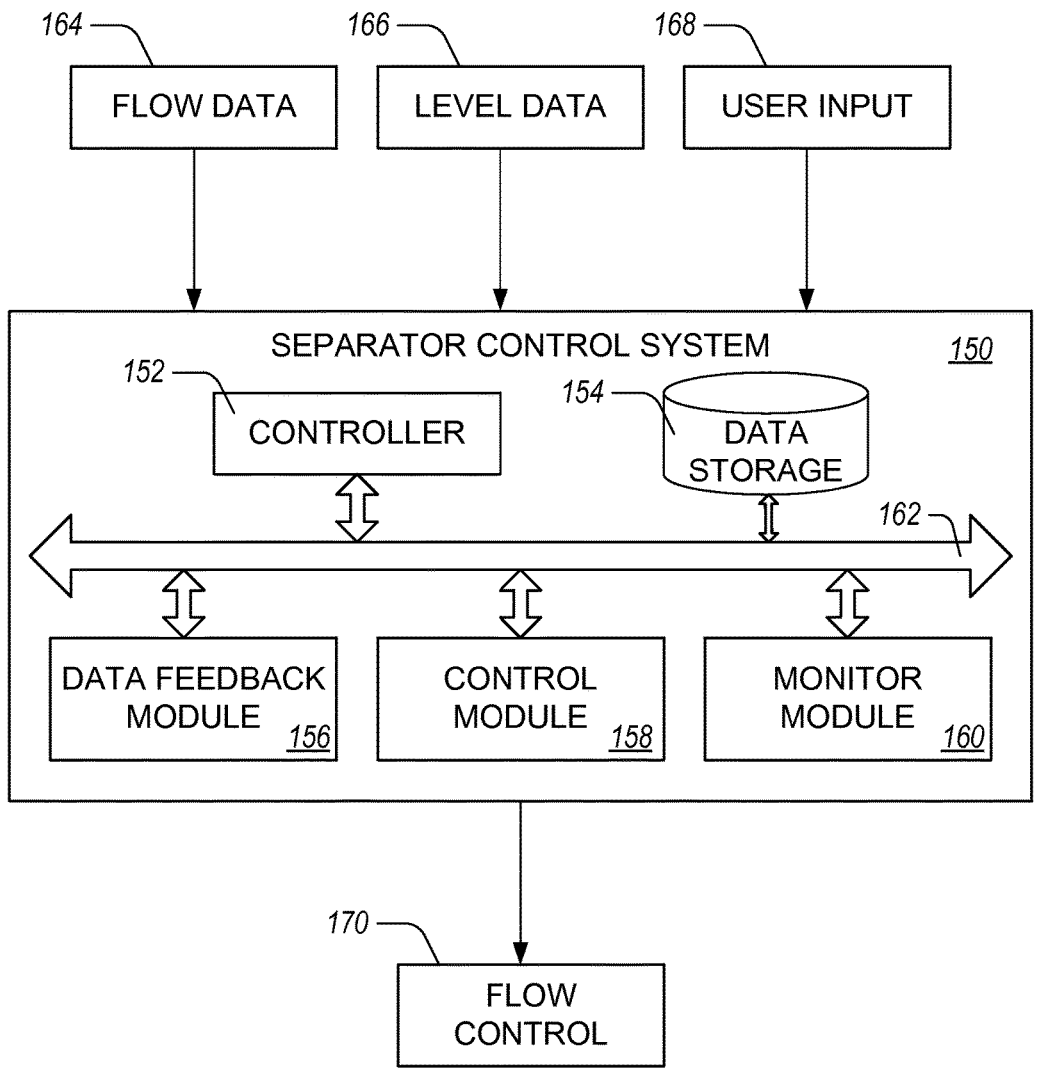
FIG. 2 illustrates a block diagram for an example separator control system configured to control and measure fluid levels and flows.

FIG. 2 illustrates a block diagram for an embodiment of a separator control system 150 configured to control and measure fluid levels and flows. The separator control system 150 can include hardware, software, and/or firmware components used to control an oil separation system 100. The separator control system 150 can be configured to receive information from various sensors and systems, to control one or more control valves based at least in part on the received information, to determine a quantity of a liquid flowing from a separator, and to provide monitoring and measurement information to an external system or user interface. The separator control system 150 can include a data feedback module 156, a control module 158, a monitor module 160, a controller 152, and data storage 154. Components of the separator control system 150 can communicate with one another, with external systems, and with other components of the oil separation system 100 over communication bus 162. The separator control system 150 can employ any method described herein for measuring data and controlling flow control valves, such as the methods 700 and 800 described herein with reference to FIGS. 7 and 8, respectively. The separator control system 150 can be configured to interface with a supervisory control and data acquisition system. The supervisory control and data acquisition system, in turn, can be connected to a plurality of separator control systems to control one or more wells and/or well sites using the control and monitoring systems and methods described herein.

The separator control system 150 includes the data feedback module 156. The data feedback module 156 can be configured to receive flow data 164 wherein the flow data 164 can be provided by flow measurement systems configured to measure flow rates of fluids in the oil separation system 100. The data feedback module 156 can be configured to receive level data 166 wherein the level data 166 can be provided by level sensors configured to measure fluid levels in vessels in the oil separation system 100. The data feedback module 156 can be configured to receive the flow data 164 and level data 166 in a variety of formats and derive measurements of flow rates, total flow volumes, current fluid levels, fluid level change rates, fluid densities, and the like. The data feedback module 156 can be configured to derive fluid level and fluid flow measurements to allow the control module 158 to reliably control fluid flow as well as to determine accurate measurements of fluid flow. The data feedback module 156 can be configured to receive user input 168 to access, modify, or control measurement parameters. The data feedback module 156 can be configured to store measurements, data analysis results, and/or raw data in the data storage 154.

The data feedback module 156 can be configured to measure an oil flow rate and an oil flow volume. The data feedback module 156 can be configured to determine the oil level in the three-phase separator 300 when the oil flow control 314 is closed (e.g., when the oil is not flowing from the three-phase separator 300). The oil level can be measured using the oil level sensor 312. In some embodiments, the oil level sensor 312 comprises a differential pressure measurement by measuring pressure above the oil level and below the oil level. The data feedback module 156 can be configured to calibrate the oil level measurement by determining the oil density using the oil flow measurement 316 and/or other oil density determination methods and then correct the oil level measurement by adjusting the oil density in the calculation of oil level, where oil level depends at least in part on measured pressures and oil density. In some embodiments, the oil flow measurement 316 comprises a Coriolis meter which provides a measurement of the oil density in the flow data 164. The data feedback module 156 can be configured to calibrate the oil level measurement by monitoring the oil level as the oil refills the three-phase separator 300. In some embodiments, like the illustrated embodiment, using a sampling and cross-checking algorithm, the data feedback module 156 can be configured to determine when the oil outlet is reached during the refill process. This level can then be used to set a baseline or zero level for the data feedback module 156. Based at least in part on this baseline level, the data feedback module 156 can monitor the oil level relative to the baseline. This can provide a measurement or an estimate of the volume of treated oil that can be dumped in a single dumping cycle (e.g., if the oil flow control 314 were to open and allow all oil above the oil outlet pipe to flow through the three-phase separator oil outlet 308).

The separator control system 150 includes the control module 158. The control module 158 can be configured to receive data analysis results and measurements from the data feedback module 156. Based at least in part on the information received from the data feedback module 156, the control module 158 can generate flow control commands 170 to send to one or more flow controls (e.g., the oil flow control 314, the water flow control 320, and/or the liquid flow control 210). In some embodiments, the flow control 170 comprises multiple control commands configured to simultaneously control a plurality of separators and/or heater treaters (e.g., 2 or more two-phase separators and 2 or more three-phase separators).

The control module 158 can be configured to utilize control algorithms to control the liquid flow control 210, the oil flow control 314, and/or the water flow control 320. For example, the control module 158 can be configured to generate flow control commands 170 for the liquid flow control 210 where the flow control commands 170 depend at least in part on the level data 166 received from the liquid level sensor 208. In some embodiments, the level data 166 comprises measurements from a differential pressure transmitter and the control module 158 opens the liquid flow control 210 when the liquid level exceeds an open valve threshold and the control module 158 closes the liquid flow control 210 when the liquid level is below a close valve threshold. The control module 158 can be configured to control the liquid level in the two-phase separator 200 using a feedback control (e.g., a proportional-integral-differential control or PID control) to maintain the liquid level within a targeted liquid level range. The targeted liquid level range can be configured such that a mechanical valve connected to the two-phase separator liquid outlet 204 remains open due at least in part to the pressure of the liquid in the two-phase separator 200 when the liquid is within the targeted liquid level range.

The control module 158 can be configured to generate flow control commands 170 for the water flow control 320 where the flow control commands 170 depend at least in part on the level data 166 received from the water level sensor 318 and/or the flow data 164 received from the water flow measurement 322. In some embodiments, the level data 166 comprises measurements from a differential pressure transmitter and the control module 158 opens the water flow control 320 when the water level exceeds an open water valve threshold and the control module 158 closes the water flow control 320 when the water level is below a close water valve threshold. The control module 158 can be configured to control the water level in the three-phase separator 300 using a feedback control (e.g., a PID control) to maintain the water level within a targeted water level range. The targeted water level range can be configured such that a mechanical valve connected to the three-phase separator water outlet 310 remains open due at least in part to the pressure of the water in the three-phase separator 300 when the water is within the targeted water level range. In some embodiments, the control module 158 can be configured to open the water flow control 320 to flush or dump water to reduce or remove gas or other contaminants from a water outlet pipe, such as the three-phase separator water outlet 310. The flush or dump flow control command 170 can be controlled using a feedback loop based at least in part on level data 166.

The control module 158 can be configured to generate flow control commands 170 for the oil flow control 314 where the flow control commands 170 depend at least in part on the level data 166 received from the oil level sensor 312 and/or the flow data 164 received from the oil flow measurement 316. In some embodiments, the level data 166 comprises measurements from a differential pressure transmitter and the control module 158 opens the oil flow control 314 when the oil level exceeds an open oil valve threshold and the control module 158 closes the oil flow control 314 when the oil level is below a close oil valve threshold. The control module 158 can be configured to control the oil level in the three-phase separator 300 using a feedback control (e.g., a PID control) to maintain the oil level within a targeted oil level range. The targeted oil level range can be configured such that a mechanical valve connected to the three-phase separator oil outlet 308 remains open due at least in part to the pressure of the oil in the three-phase separator 300 when the oil is within the targeted water level range.

As described herein, the separator control system 150 can be configured to accurately measure oil flow (e.g., total oil volume in a dump cycle). Accurate flow measurements can depend at least in part on flow rates, as different oil flow measurement systems may be sensitive to flow rate. For example, a slow oil flow rate may result in a relatively large uncertainty in the flow rate measurement. To achieve an accurate flow measurement, the control module 158 can be configured to allow the oil level to rise to a relatively high level so that when the oil is dumped by opening the oil flow control 314, the flow rate is within a targeted flow rate range. The targeted flow rate range can be a range of flow rates where the flow rate measurement is accurate within a targeted uncertainty. The control module 158 can be configured to close the oil flow control 314 prior to gas being sucked into the three-phase separator oil outlet. This is advantageous as gas in the oil outlet piping may introduce errors into the measurement of oil volume dumped in a dump cycle.

The separator control system 150 includes the monitor module 160. The monitor module 160 can be configured to provide output to a data logging device or system, to the data storage 154, to a user interface, or the like to enable a system or user to monitor the status of the oil separation system 100. The monitor module 160 can be configured to provide a graphical user interface that provides real time status of the oil separation system 100. The monitor module 160 can be configured to include failsafe routines to handle surges in fluid flow. For example, if the fluid flow is too high, the monitor module 160 can generate a warning, alarm, or notification for another system or user. The monitor module 160 can communicate with the control module 158 to indicate that one or more flow controls should be adjusted, depending on the situation. The monitor module 160 can be configured to provide on-screen diagnostics that allow a user to access system operating conditions and performance. For example, the monitor module 160 can provide access to flow control or valve positions, measured or estimated fluid flow rates, flow meter drive gain, oil and water levels, operating setpoints, alarm states, fluid density, fluid temperature, or the like. The monitor module 160 can be configured to provide data logging to track production data for oil dump cycles. The monitor module 160 can be configured to track daily and monthly production totals (e.g., total volume of treated oil deposited in oil storage). The monitor module 160 can be configured to track start times, oil volume, average fluid temperature, average fluid density, starting and ending inventory, run time, and the like.

The separator control system 150 includes a controller 152. The controller 152 can include one or more hardware processors and can be used by any of the other components, such as the data feedback module 156, the control module 158, and/or the monitor module 160 to process information. As used herein, the term "processor" refers broadly to any suitable device, logical block, module, circuit, or combination of elements for executing instructions. The controller 152 can be any conventional general purpose single- or multi-chip microprocessor. In addition, the controller 152 can be any special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), programmable logic controller (PLC), single loop controller (SLC), or other programmable logic device, discrete gate or transistor logic, discrete hardware components, circuitry, or any combination thereof designed to perform the functions described herein. A general purpose processor, such as controller 152, can be a conventional microprocessor, but the controller 152 can also be any conventional processor, controller, microcontroller, or state machine. Controller 152 can also be implemented as a combination of computing devices, e.g., a combination of a DSP and a microprocessor, a plurality of microprocessors, one or more microprocessors in conjunction with a DSP core, one or more PLCs, a PLC with a conventional microprocessor, or any other such configuration.

The separator control system 150 includes data storage 154. Data storage 154 can be coupled to the other components of the separator control system 150, such as the controller 152, the data feedback module 156, the control module 158, and/or the monitor module 160. Data storage 154 can refer to non-transitory electronic circuitry that allows information, typically computer data, to be stored and retrieved. Data storage 154 can refer to external devices or systems, for example, disk drives, optical drives, or solid state drives. Data storage 154 can also refer to fast semiconductor storage (chips), for example, Random Access Memory (RAM) or various forms of Read Only Memory (ROM), which are directly connected to the one or more processors of the separator control system 150. Other types of memory include bubble memory and core memory.

Retrofit Two-Phase Separator

Figure 3:
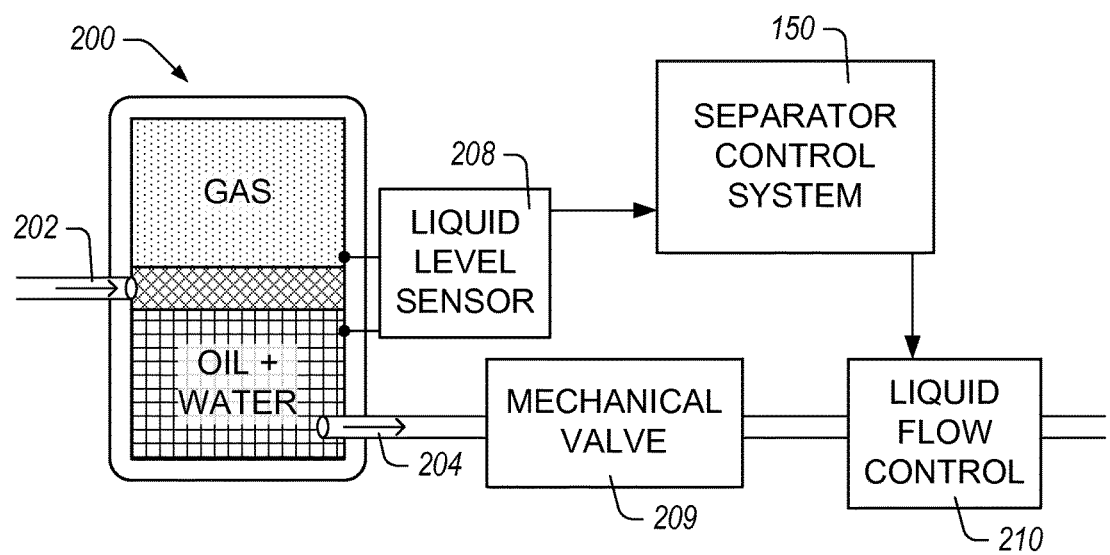
FIG. 3 illustrates an example two-phase separator retrofit to include a level sensor and a flow control.

FIG. 3 illustrates a two-phase separator 200 retrofit to include a level sensor and a flow control. Retrofitting can include adding elements to an existing object to change, remove, and/or add functionality. The two-phase separator 200 can be configured to receive a mixture of fluids from one or more wells or another source through the mixture input 202. The two-phase separator 200 includes a liquid output 204 configured to allow the separated liquid (e.g., oil emulsion) to flow from the tank or vessel.

Prior to being retrofit, flow of the separated liquid typically is controlled by a passive mechanical valve 209. The mechanical valve 209 is configured to open when the separated liquid is above an opening threshold level (e.g., due at least in part to the pressure on the mechanical valve 209) and close when the separated liquid is below a closing threshold level. In some embodiments, the mechanical valve 209 comprises a float in the tank, the float coupled to a lever that is coupled to the mechanical valve 209. When the liquid level rises above the opening threshold level, the float rises and the lever acts to open the mechanical valve 209. When the liquid level drops below the closing threshold level, the float sinks and the lever acts to close the mechanical valve 209.

To retrofit the two-phase separator 200, a liquid level sensor 208, a liquid flow control 210, and a separator control system 150 may be added to the two-phase separator 200. The liquid level sensor 208 is added to provide sensor readings corresponding to a liquid level in the vessel. In some embodiments, the liquid level sensor 208 comprises a pair of pressure sensors positioned above and below an expected liquid level, the liquid level sensor 208 measuring a liquid level by determining a pressure difference using the pair of pressure sensors. The liquid flow control 210 is added to the two-phase separator 200 after the mechanical valve 209 to actively control the flow of liquid in the two-phase separator liquid outlet 204. In some embodiments, the liquid flow control 210 comprises an electrically or pneumatically controlled valve. For example, the liquid flow control 210 can comprise a ball valve. The separator control system 150 is added to the two-phase separator 200 to actively control opening and closing the liquid flow control 210 based at least in part on liquid level in the vessel. The separator control system 150 receives measurements from the liquid level sensor 208 and determines whether to adjust the liquid flow control 210, and determines how much to open the liquid flow control 210 if it is to be opened. In some embodiments, the separator control system 150 is configured to allow the liquid level to exceed the opening threshold level during operation so that the mechanical valve 209 remains open during operation. In some embodiments, the liquid flow control 210 is configured to remain open in the event of an error or failure in the liquid level sensor 208, the liquid flow control 210, and/or the separator control system 150. This way, the two-phase separator 200 can continue to operate as it did prior to the retrofit.

The separator control system 150 can include a feedback (e.g., PID) loop to control the liquid flow control 210 to maintain a relatively constant liquid level in the tank. The separator control system 150 can use, for example, a dedicated PID control device to run the PID control loop. The separator control system 150 can use, as another example, a PLC to provide the option of writing a program tailored to the two-phase separator 200 being retrofit. The PLC can also run a feedback loop to control fluid levels, along with adding features such as error reporting, data logging, and fail-safe functions.

The retrofit two-phase separator 200 provides a number of advantages. For example, the retrofit two-phase separator 200 can include valves that are self-cleaning. When a ball valve opens and closes, that action wipes salt deposits from the valve. The separator control system 150 can be configured to periodically or intermittently close itself to wipe the surfaces of the ball valve to reduce or remove build-up of salt. As another example, the retrofit two-phase separator 200 can be controlled automatically from the separator control system 150 using data from the liquid level sensor 208 as feedback. As another example, the retrofit two-phase separator 200 allows a user to control the operation of the separator through the separator control system 150. As another example, the separator control system 150 can be configured to open the liquid flow control 210 to reduce or prevent overflow if the level of liquid reaches a high level setpoint. This may occur, for example, where there is a higher than normal input flow rate from a well or the like.

Retrofit Three-Phase Separator

Figure 4:
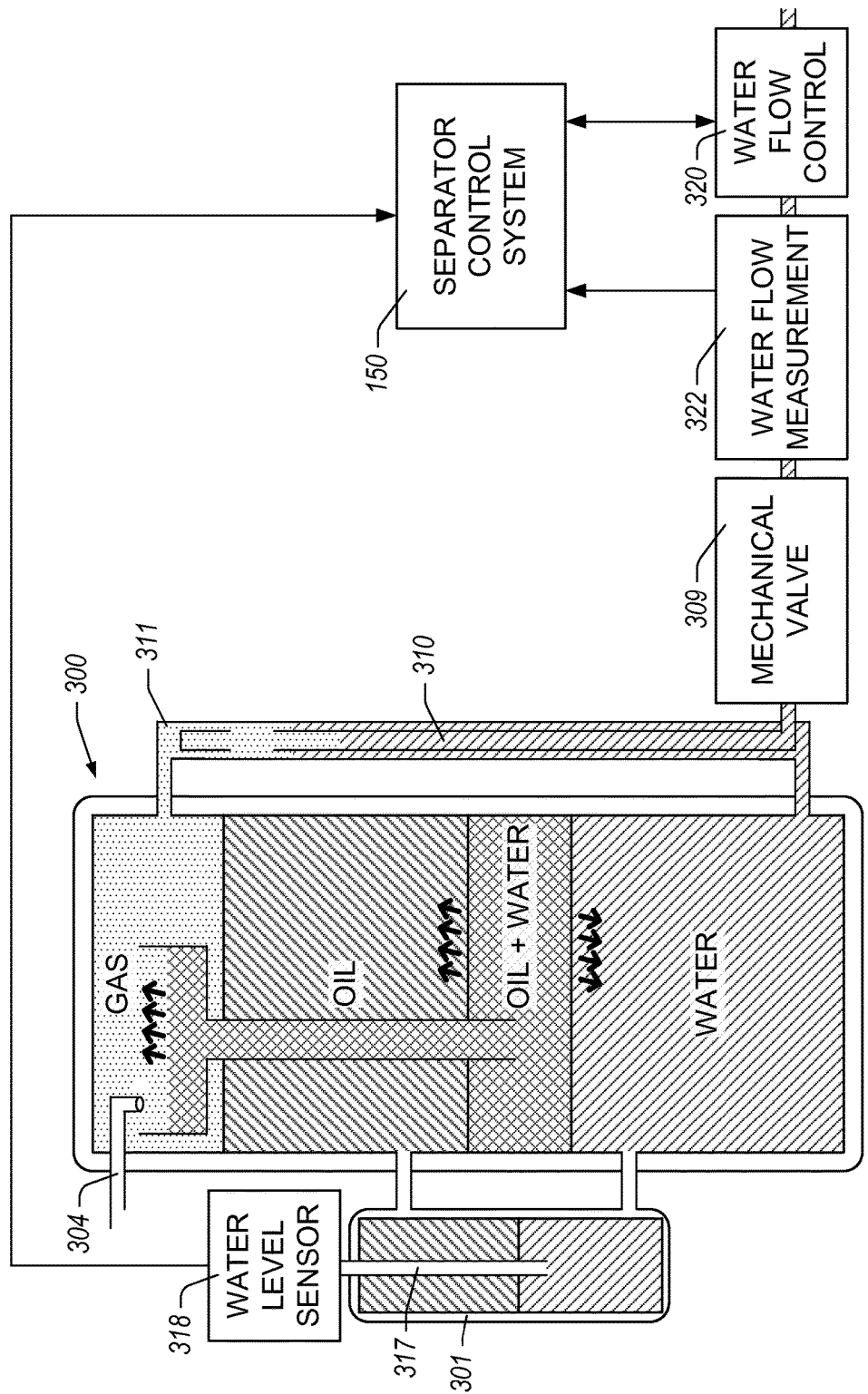
FIG. 4 illustrates an example three-phase separator retrofit to include a bridle coupled thereto, the three-phase separator further retrofit to include a water level sensor, a water flow control, and a water flow measurement system.

FIG. 4 illustrates a three-phase separator 300 retrofit to include a bridle 301 coupled thereto, the three-phase separator 300 further retrofit to include a water level sensor 318, a water flow control 320, and a water flow measurement 322. The three-phase separator 300 can be configured to receive a mixture of liquids (e.g., an oil emulsion) from a two-phase separator or another source through the three-phase separator inlet 304. The three-phase separator 300 includes a three-phase separator water outlet 310 configured to allow separated water to flow from the tank or vessel.

Prior to being retrofit, flow of the separated water typically is controlled by a passive mechanical valve 309. The mechanical valve 309 is configured to open when the separated water is above an opening threshold level (e.g., due at least in part to the pressure on the mechanical valve 309) and close when the separated water is below a closing threshold level. The mechanical valve 309 can be positioned at a bottom of a water siphon tube 311 comprising an internal tube 310 configured to allow water and gas into the inner tube 310. The inner tube 310 leads to a water outlet and the flow of water through the water outlet is controlled by the mechanical valve 309.

To retrofit the three-phase separator 300, a bridle 301, water level sensor 318, a water flow control 320, and a separator control system 150 may be added to the three-phase separator 300. The bridle 301 comprises a tank separate from the main tank or vessel of the three-phase separator 300, but operatively coupled to the main tank so that the fluids in the tank freely flow into the bridle 301. The fluid level in the bridle 301 generally matches the fluid level in the tank but is more stable as there is less turbulence in the bridle 301 because waves in the main tank generally do not disturb the fluid level in the bridle 301. The damping effect of the fluid flow through the bridle attachment tube keeps the fluid level in the bridle steady relative to the fluid level in the main tank, providing accurate readings. The bridle 301 includes a water level sensor 318 (e.g., capacitance sensor) and probe 317 that are configured to determine a height of the oil/water interface in the bridle 301. The capacitance probe 318 includes a straight piece of tubing that may be difficult to include in the main tank of an existing separator. The bridle 301 advantageously provides a place to attach the capacitance probe 318 and can be configured to function utilizing existing ports on the side of the tank where a site tube normally resides.

The water level sensor 318 is added to provide sensor readings corresponding to a water level in the vessel. In some embodiments, the water level sensor 318 comprises a capacitance probe configured to determine the location of the oil/water interface. The water flow control 320 is added to the three-phase separator 300 after the mechanical valve 309 to actively control the flow of water in the three-phase separator water outlet 310. In some embodiments, the water flow control 320 comprises an electrically or pneumatically controlled valve. For example, the water flow control 320 can comprise a ball valve. The separator control system 150 is added to the three-phase separator 300 to actively control opening and closing the water flow control 320 based at least in part on water level in the vessel. The separator control system 150 receives measurements from the water level sensor 318 and determines whether to adjust the water flow control 320, and determines how much to open the water flow control 320 if it is to be opened. In some embodiments, the separator control system 150 is configured to allow the water level to exceed the opening threshold level during operation so that the mechanical valve 309 remains open during operation. In some embodiments, the water flow control 320 is configured to remain open in the event of an error or failure in the water level sensor 318, the water flow control 320, and/or the separator control system 150. This way, the three-phase separator 300 can continue to operate as it did prior to the retrofit. The water flow measurement 322 is added to provide flow rate measurements to enable tracking of the amount of water dumped from the three-phase separator 300. The water flow measurement 322 can comprise a turbine or Coriolis meter.

The separator control system 150 can include a feedback (e.g., PID) loop to control the water flow control 320 to maintain a relatively constant water level in the tank. The separator control system 150 can use, for example, a dedicated PID control device to run the PID control loop. The separator control system 150 can use, as another example, a PLC to provide the option of writing a program tailored to the three-phase separator 300 being retrofit. The PLC can also run a feedback loop to control water levels, along with adding features such as error reporting, data logging, and fail-safe functions.

The retrofit three-phase separator 300 provides a number of advantages. For example, the retrofit three-phase separator 300 can include valves that are self-cleaning. When a ball valve opens and closes, that action wipes salt deposits from the valve. The separator control system 150 can be configured to periodically or intermittently close itself to wipe the surfaces of the ball valve to reduce or remove build-up of salt. As another example, the retrofit three-phase separator 300 can be controlled automatically from the separator control system 150 using data from the water level sensor 318 as feedback. As another example, the retrofit three-phase separator 300 allows a user to control the operation of the separator through the separator control system 150. As another example, the separator control system 150 can be configured to close the water flow control 320 and then open it wide to flush out entrained gas in the water piping. This can increase the accuracy of flow measurements by removing gas from the water piping that can cause errors in flow rate and flow volume calculations.

Figure 5:
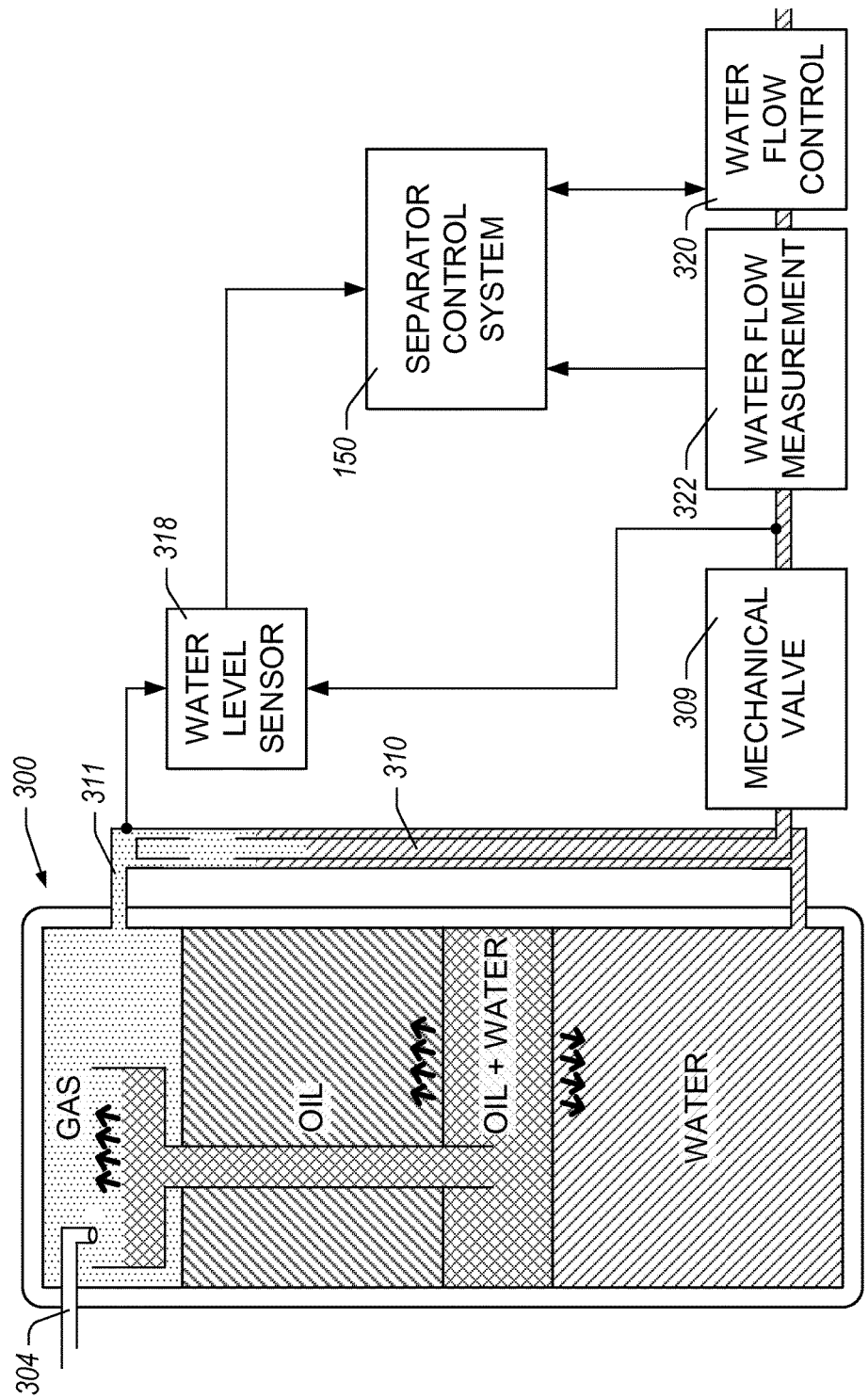
FIG. 5 illustrates an example three-phase separator retrofit to include a water level sensor, a water flow control, and a water flow measurement system.

Similar to the three-phase separator 300 illustrated in FIG. 4, the three-phase separator 300 illustrated in FIG. 5 is retrofit to include a water level sensor 318, a water flow control 320, a water flow measurement 322, and a separator control system 150. The three-phase separator 300 incorporates the water level sensor 318 into the water siphon tube 311. The water level sensor 318 comprises a pair of pressure sensors and a differential pressure transmitter configured to provide pressure measurements to the separator control system 150. Otherwise, the three-phase separator 300 is similar to the three-phase separator 300 illustrated in FIG. 4.

By incorporating the water level sensor 318, the water flow control 320, and the water flow measurement 322 into the water siphon tube 311, the piping can be housed in a small building next to the main vessel. This can allow for the three-phase separator water outlet 310 to be housed indoors out of the elements, bringing measurement and control hardware indoors. The retrofit three-phase separator 300 maintains the mechanical valve 309 in service and is configured to maintain a water level such that the mechanical valve 309 remains open. The three-phase separator 300 can thus be configured to remain operational in the case of failure of the water flow control 320 as the water flow control 320 is configured to fail in an open state. For example, the water flow control 320 can incorporate a spring return or powered battery backup return to force the water flow control 320 into she open position.

Figure 6A:
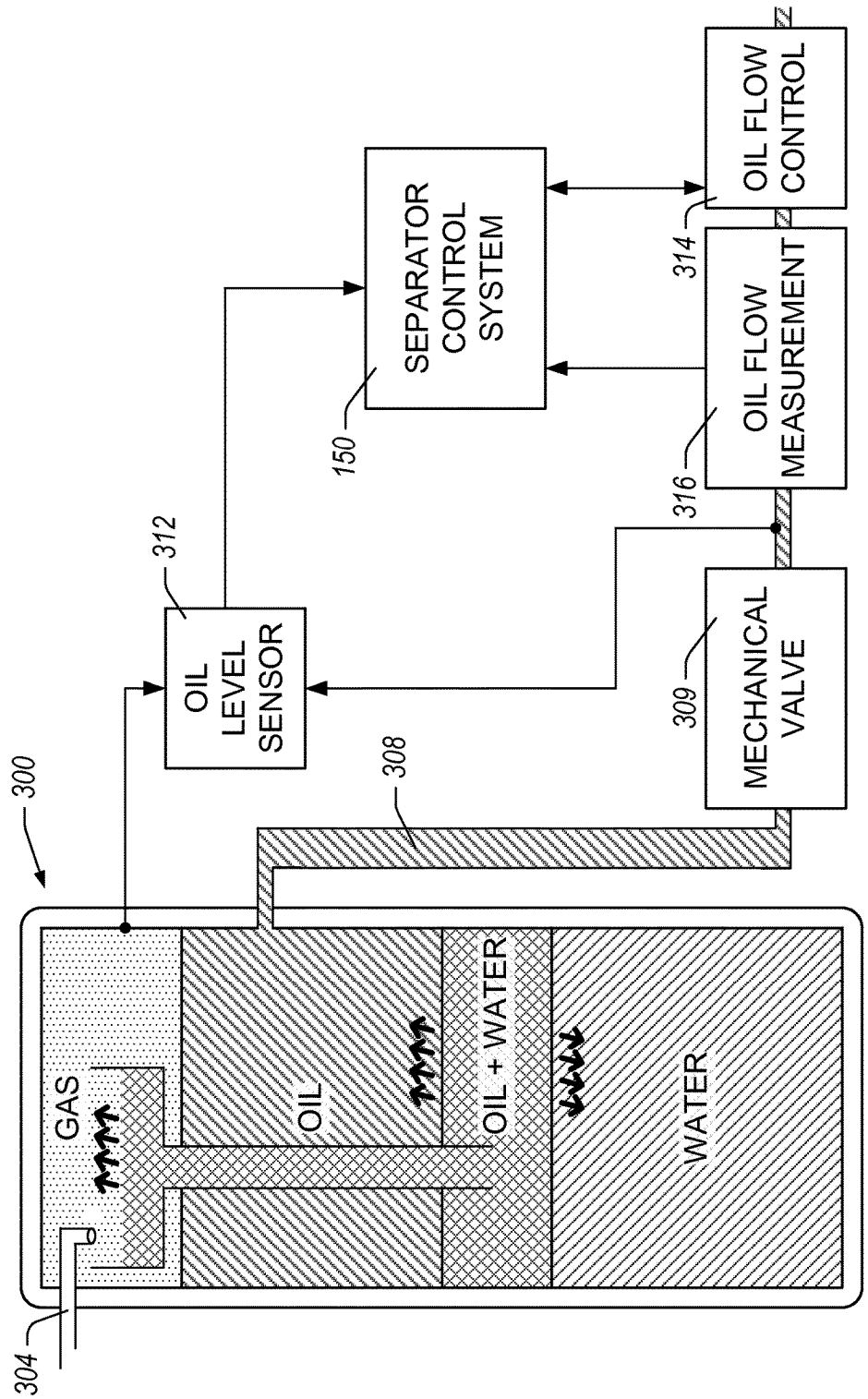
FIGS. 6A and 6B illustrate an example three-phase separator retrofit to include an oil level sensor, an oil flow control, and an oil flow measurement system.
Figure 6B:
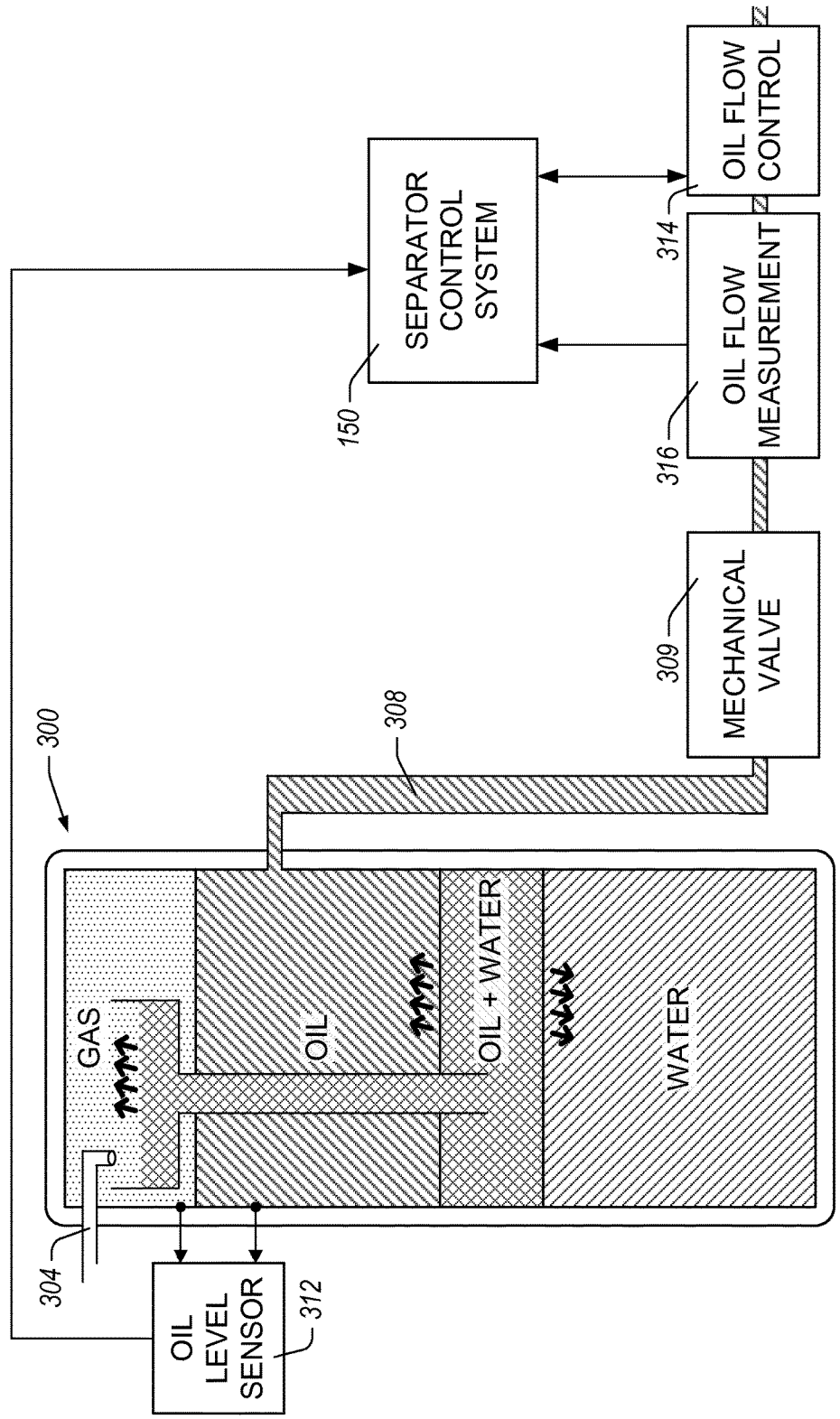

FIGS. 6A and 6B illustrate a three-phase separator 300 retrofit to include an oil level sensor 312, an oil flow control 314, and an oil flow measurement 316. The three-phase separator 300 can be configured to receive a mixture of liquids (e.g., an oil emulsion) from a two-phase separator or another source through the three-phase separator inlet 304. The three-phase separator 300 includes a three-phase separator oil outlet 308 configured to allow treated oil to flow from the tank or vessel.

Prior to being retrofit, flow of the treated oil is controlled by a passive mechanical valve 309. The mechanical valve 309 is configured to open when the treated oil is above an opening threshold level (e.g., due at least in part to the pressure on the mechanical valve 309) and close when the treated oil is below a closing threshold level. The mechanical valve 309 can be positioned at a bottom of the three-phase separator oil outlet 308 comprising piping configured to allow oil to exit the tank or vessel. The flow of oil through the three-phase separator oil outlet 308 is controlled by the mechanical valve 309.

To retrofit the three-phase separator 300, the oil level sensor 312, the oil flow control 314, and the separator control system 150 are added to the three-phase separator 300. The oil level sensor 312 is added to provide sensor readings corresponding to an oil level in the vessel. In some embodiments, the oil level sensor 312 comprises a differential pressure transmitter including a pair of pressure sensors positioned above the oil level in the main vessel and within the three-phase separator oil outlet 308 after the mechanical valve 309, as illustrated in FIG. 6A. In some embodiments, the oil level sensor 312 comprises a differential pressure transmitter including a pair of pressure sensors positioned above and below the oil level in the main vessel, as illustrated in FIG. 6B. In these embodiments, the separator control system 150 receives pressure differential readings from the oil level sensor 312. The oil flow control 314 is added to the three-phase separator 300 after the mechanical valve 309 to actively control the flow of oil in the three-phase separator oil outlet 308. In some embodiments, the oil flow control 314 comprises an electrically or pneumatically controlled valve. For example, the oil flow control 314 can comprise a ball valve. The separator control system 150 is added to the three-phase separator 300 to actively control opening and closing the oil flow control 314 based at least in part on oil level in the vessel. The separator control system 150 receives measurements from the oil level sensor 312 and determines whether to adjust the oil flow control 314, and determines how much to open the oil flow control 314 if it is to be opened. In some embodiments, the separator control system 150 is configured to allow the oil level to exceed the opening threshold level during operation so that the mechanical valve 309 remains open during operation. In some embodiments, the oil flow control 314 is configured to remain open in the event of an error or failure in the oil level sensor 312, the oil flow control 314, and/or the separator control system 150. This way, the three-phase separator 300 can continue to operate as it did prior to the retrofit. The oil flow measurement 316 is added to provide flow rate measurements to enable tracking of the amount of oil dumped from the three-phase separator 300. The oil flow measurement 316 can comprise a turbine or Coriolis meter.

The separator control system 150 can include a feedback (e.g., PID) loop to control the oil flow control 314 to maintain a targeted level of oil in the main vessel. In some embodiments, the targeted level of oil is such that when the oil is dumped, the flow rate is within a targeted flow rate range so that the oil flow measurement 316 provides an accurate flow rate measurement. This can mean that the separator control system 150 is configured to maintain a relatively high level of oil in the main vessel prior to dumping the oil. The separator control system 150 can use, for example, a dedicated PID control device to run the PID control loop. The separator control system 150 can use, as another example, a PLC to provide the option of writing a program tailored to the three-phase separator 300 being retrofit. The PLC can also run a feedback loop to control oil levels, along with adding features such as error reporting, data logging, and fail-safe functions.

The retrofit three-phase separator 300 provides a number of advantages. For example, the retrofit three-phase separator 300 can include valves that are self-cleaning. When a ball valve opens and closes, that action wipes salt deposits from the valve. The separator control system 150 can be configured to periodically or intermittently close itself to wipe the surfaces of the ball valve to reduce or remove build-up of salt. As another example, the retrofit three-phase separator 300 can be controlled automatically from the separator control system 150 using data from the oil level sensor 312 as feedback. As another example, the retrofit three-phase separator 300 allows a user to control the operation of the separator through the separator control system 150. As another example, the separator control system 150 can be configured to provide a correction or calibration for variations in oil density. The density of oil will vary with environmental conditions such as temperature. The separator control system 150 can include implement an algorithm that uses a rate of change of oil level to identify the point where the oil level drops below the level of the three-phase separator oil outlet in the main vessel. The algorithm can identify this point by identifying that the oil level in the tube drops significantly faster than when the oil level is above this point. The separator control system 150 can be configured to monitor the pressure of the oil over several cycles to identify this point. The separator control system 150 can then determine oil density or oil density corrections based at least in part on the known height of the oil outlet from the tank to the three-phase separator oil outlet and the corresponding measured pressure.

By incorporating the oil level sensor 312, the oil flow control 314, and the oil flow measurement 316 into the three-phase separator oil outlet 308, the piping can be housed in a small building next to the main vessel. This can allow for the three-phase separator oil outlet 308 to be housed indoors out of the elements, bringing measurement and control hardware indoors. The retrofit three-phase separator 300 maintains the mechanical valve 309 in service and is configured to maintain an oil level such that the mechanical valve 309 remains open. The three-phase separator 300 can thus be configured to remain operational in the case of failure of the oil flow control 314 as the oil flow control 314 is configured to fail in an open state. For example, the oil flow control 314 can incorporate a spring return or powered battery backup return to force the oil flow control 314 into the open position.

The oil separation system 100 illustrated in FIG. 1 can include any combination of the two-phase separator 200 illustrated in FIG. 3 and the three-phase separator 300 illustrated in FIGS. 4-6B. Elements of the embodiments of the three-phase separator 300 described herein with reference to FIGS. 4 and 5 can be combined with elements of the embodiments of the three-phase separator 300 described herein with reference to FIGS. 6A and 6B. For example, the water level sensor 318 and the water flow control 320 of the three-phase separator 300 described with reference to FIG. 4 or 5 can be combined with the oil level sensor 312 and the oil flow control 314 of the three-phase separator 300 described with reference to FIG. 6A or 6B.

Method for Controlling Fluid Flow from a Two-Phase Separator

Figure 7:
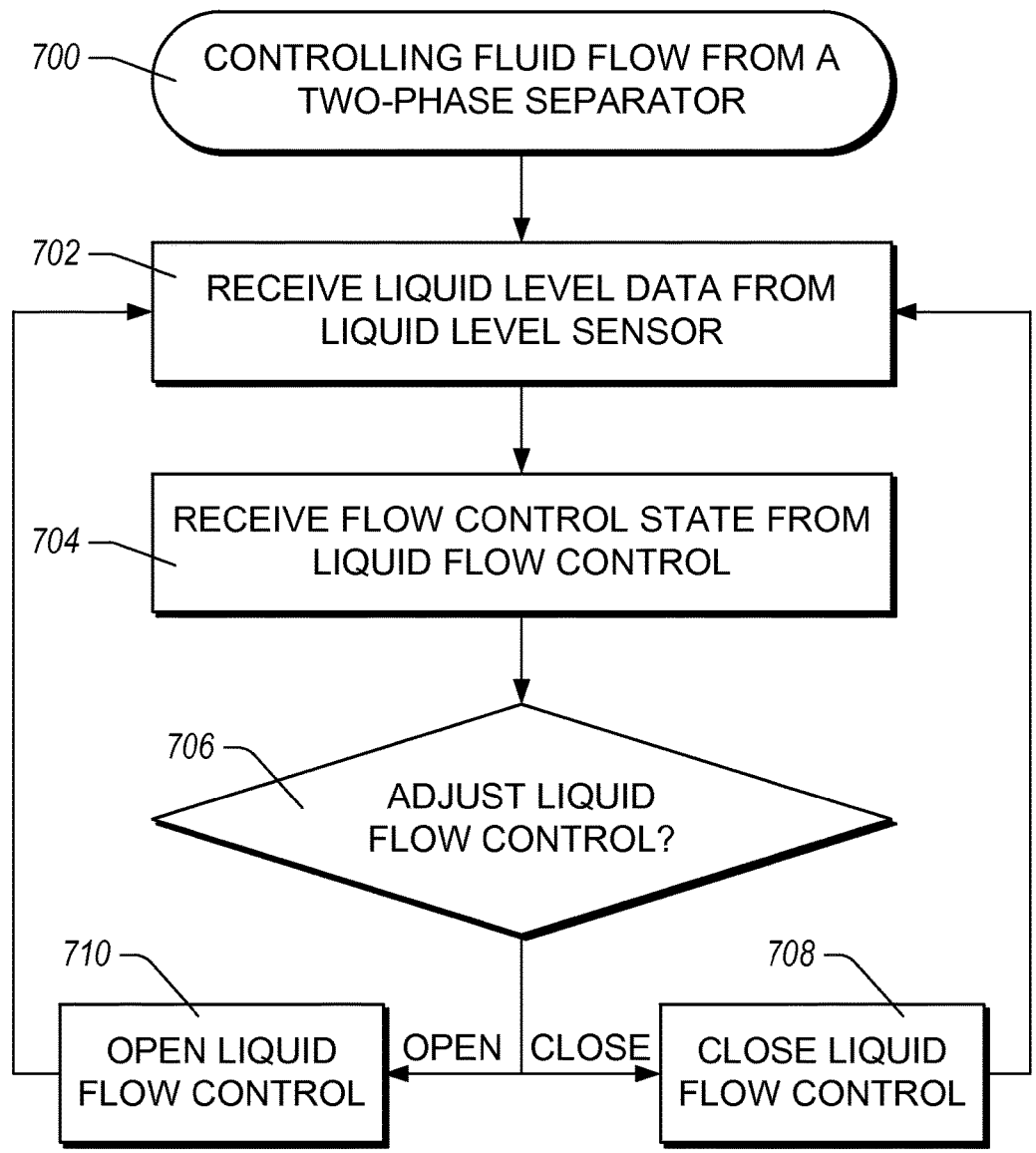
FIG. 7 illustrates a flow chart of an example method for controlling fluid flow from a two-phase separator.

FIG. 7 illustrates a flow chart of an example method 700 for controlling fluid flow from a two-phase separator, such as the two-phase separator 200 of the oil separation system 100 as illustrated in FIG. 1. For ease of description, the method 700 is described as being performed by a separator control system 150, such as the separator control system 150 illustrated in FIG. 2. The method 700 can be implemented by one or more of the components of the separator control system 150 where a module or combination of modules can perform one or more steps of the method 700. Similarly, a single step can be performed by a combination of modules in the separator control system 150.

At block 702, the separator control system 150 receives liquid level data from a liquid level sensor. The liquid level sensor can be the liquid level sensor 208 described herein with reference to FIG. 1 or 3. The liquid level data can correspond to a level of the liquid in the two-phase separator 200.

At block 704, the separator control system 150 receives the liquid flow control state to determine whether liquid is flowing from the two-phase separator 200. The liquid flow control state can be provided by a liquid flow control, such as the liquid flow control 210 described herein with reference to FIG. 1 or 3. The liquid flow control state can include, for example and without limitation, valve open, valve closed, valve failed, error, and/or an opening percentage of the valve (e.g., 10% open, 20% open, 54% open, 100% open, etc.). In some embodiments, the separator control system 150 can be configured to analyze over time the liquid level data received at block 702 to determine the rate of change of the liquid level in the tank. If the liquid level is decreasing, the separator control system 150 can determine that liquid is flowing from the two-phase separator 200.

At block 706, the separator control system 150 analyzes the liquid level data to determine whether to adjust the liquid flow control. In some embodiments, the separator control system 150 is configured to maintain the liquid level relatively constant in the two-phase separator 200. The separator control system 150 can utilize a feedback loop to adjust the opening of the liquid flow control to maintain the relatively constant liquid level. For example, if the separator control system 150 determines that the liquid level is decreasing, the separator control system 150 can reduce the amount the liquid flow control is open. If the separator control system 150 determines that the liquid level is increasing, the separator control system 150 can increase the amount the liquid flow control is open. In some embodiments, the separator control system 150 is configured to maintain a liquid level above a liquid level open threshold corresponding to a liquid level which maintains a mechanical valve open, such as with the retrofit two-phase separator 200 described herein with reference to FIG. 3.

At block 708, the separator control system 150 closes the liquid flow control if the level is below a liquid level close threshold. This allows the level of liquid to increase in the vessel if the fluid mixture is entering the two-phase separator 200 through the two-phase separator inlet 202.

At block 710, the separator control system 150 opens the liquid flow control if the liquid level is above a liquid level open threshold. The separator control system 150 can be configured to determine whether the liquid level is increasing and adjust the opening of the liquid flow control to maintain the liquid level above the liquid level open threshold. In some embodiments, the separator control system 150 can be configured to open the liquid flow control, or increase the amount the liquid flow control is open, if the liquid level reaches a high level setpoint. This can be done to prevent or reduce the likelihood of overflow in the two-phase separator 200.

The separator control system 150 can be configured to return to block 702 until operation ceases, such as through satisfaction of shutdown conditions or a manual shutdown. This allows the separator control system 150 to maintain consistent and efficient operation of the two-phase separator 200 through the operation of the liquid flow control 210 and through feedback from the liquid level sensor 208.

Method for Controlling and Measuring Fluid Flow from a Three-Phase Separator

Figure 8:
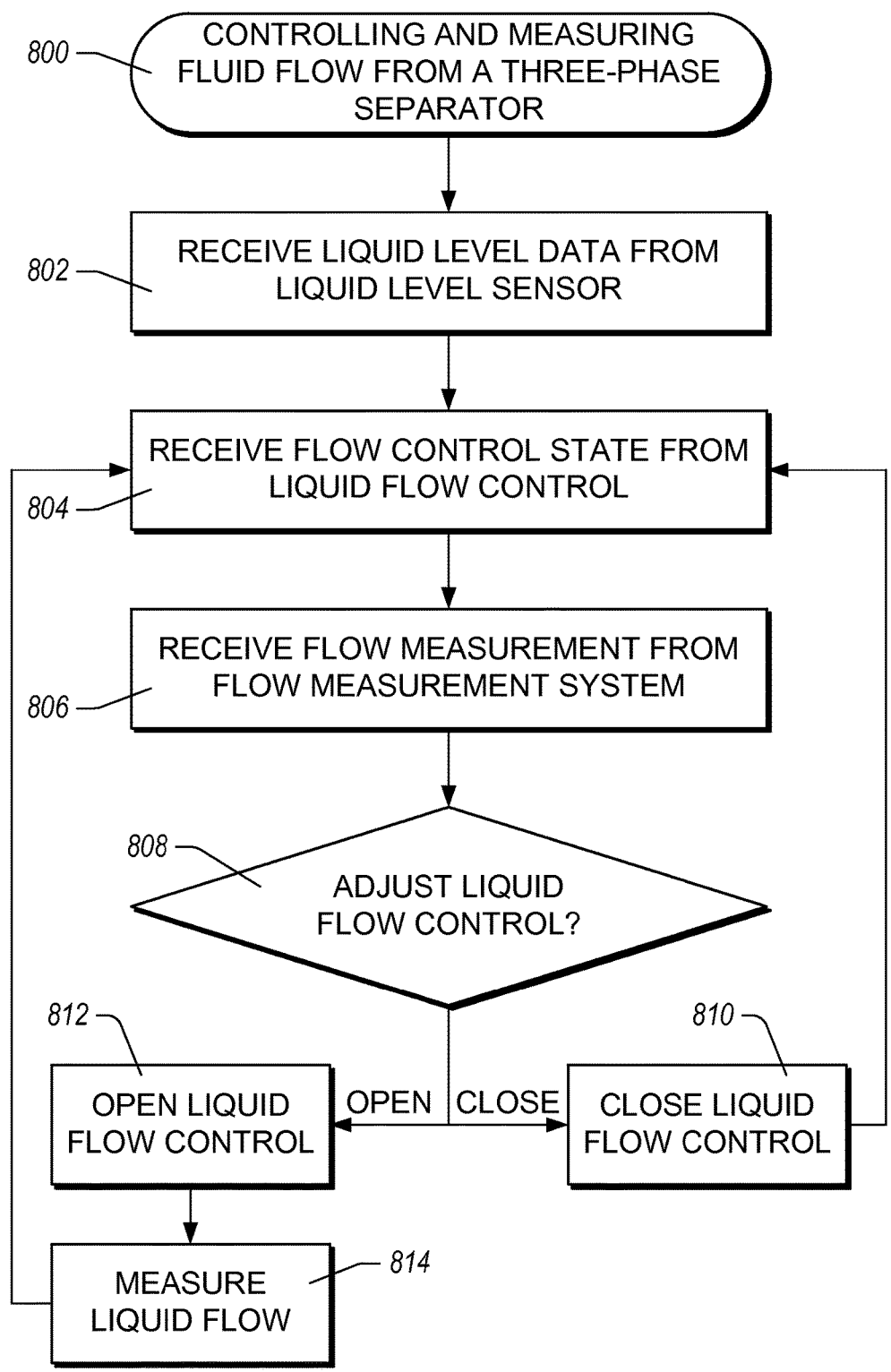
FIG. 8 illustrates a flow chart of an example method for controlling and measuring fluid flow from a three-phase separator.

FIG. 8 illustrates a flow chart of an example method 800 for controlling and measuring fluid flow from a three-phase separator, such as the three-phase separator 300 of the oil separation system 100 as illustrated in FIG. 1. For ease of description, the method 800 is described as being performed by a separator control system 150, such as the separator control system 150 illustrated in FIG. 2. The method 800 can be implemented by one or more of the components of the separator control system 150 where a module or combination of modules can perform one or more steps of the method 800. Similarly, a single step can be performed by a combination of modules in the separator control system 150.

At block 802, the separator control system 150 receives liquid level data from a liquid level sensor. The liquid level sensor can be the water level sensor 318 described herein with reference to FIG. 1, 4 or 5 or the oil level sensor 312 described herein with reference to FIG. 1, 6A, or 6B. The liquid level data can correspond to a level of water and/or oil in the three-phase separator 300. In some embodiments, the liquid level sensor provides more reliable readings when the oil and/or water are not flowing out of the vessel. Accordingly, the separator control system 150 can be configured to ignore liquid level data when the corresponding liquid is flowing or weight liquid level data based at least in part on whether the data is received when the corresponding liquid is flowing. The separator control system 150 can be configured to determine a liquid level by calculating a running average of the liquid level derived from the liquid level data.

At block 804, the separator control system 150 receives the liquid flow control state to determine whether liquid is flowing from the three-phase separator 300. The liquid flow control state can be provided by a liquid flow control, such as the water flow control 320 described herein with reference to FIG. 1, 4, or 5 or the oil flow control 314 described herein with reference to FIG. 1, 6A, or 6B. The liquid flow control state can include, for example and without limitation, valve open, valve closed, valve failed, error, and/or an opening percentage of the valve (e.g., 10% open, 20% open, 54% open, 100% open, etc.). In some embodiments, the separator control system 150 can be configured to analyze over time the liquid level data received at block 802 to determine the rate of change of the liquid level in the tank. If the liquid level is decreasing, the separator control system 150 can determine that liquid is flowing from the three-phase separator 300.

At block 806, the separator control system 150 receives flow measurement data from a liquid flow measurement system. The liquid flow measurement system can include the water flow measurement 322 described herein with reference to FIG. 1, 4, or 5 or the oil flow measurement 316 described herein with reference to FIG. 1, 6A, or 6B. The separator control system 150 can be configured to use the flow measurement data in a feedback control loop to adjust the percentage that the flow control is open. For example, it may be desirable to maintain a liquid flow out of the three-phase separator 300 within a targeted flow rate. The separator control system 150 can utilize the flow measurement data to adjust the flow control valve to achieve a flow rate within the targeted flow rate.

At block 808, the separator control system 150 analyzes the liquid level data to determine whether to adjust the liquid flow control. In some embodiments, the separator control system 150 is configured to maintain the liquid level relatively constant in the three-phase separator 300. The separator control system 150 can utilize a feedback loop to adjust the opening of the liquid flow control to maintain the relatively constant liquid level. For example, if the separator control system 150 determines that the liquid level is decreasing, the separator control system 150 can reduce the amount the liquid flow control is open. If the separator control system 150 determines that the liquid level is increasing, the separator control system 150 can increase the amount the liquid flow control is open. In some embodiments, the separator control system 150 is configured to maintain a liquid level above a liquid level open threshold corresponding to a liquid level which maintains a mechanical valve open, such as with the retrofit three-phase separator 300 described herein with reference to FIGS. 4-6B.

In some embodiments, the separator control system 150 is configured to predict when a liquid level will reduce below a threshold level, such as below an outlet to the three-phase separator oil outlet 308. The separator control system 150 can be configured to close the corresponding liquid flow control prior to the liquid level descending below the threshold level to prevent or reduce the likelihood that gas will enter the liquid output. As described herein, the separator control system 150 can be configured to determine the height of the oil output through analysis of liquid level data and liquid flow rates.

At block 810, the separator control system 150 closes the liquid flow control if the level is below a liquid level close threshold. This allows the level of liquid to increase in the vessel if the fluid mixture is entering the three-phase separator 300 through the three-phase separator inlet 304. This also reduces the likelihood that gas will enter the three-phase separator oil outlet 308 and/or three-phase separator water outlet 310.

At block 812, the separator control system 150 opens the liquid flow control if the liquid level is above a liquid level open threshold. The separator control system 150 can be configured to determine whether the liquid level is increasing and adjust the opening of the liquid flow control to maintain the liquid level above the liquid level open threshold. In some embodiments, the separator control system 150 can be configured to open the liquid flow control, or increase the amount the liquid flow control is open, if the liquid level reaches a high level setpoint. This can be done to prevent or reduce the likelihood of overflow in the three-phase separator 300. In some embodiments, the separator control system 150 opens the liquid flow control to achieve a targeted flow rate range to acquire an accurate flow rate reading, as described herein. Feedback from the liquid flow measurement system can be used to adjust an amount that the flow control is open to achieve the targeted flow rate range.

At block 814, the separator control system 150 determines a flow rate of oil using data from the liquid flow measurement system. In some embodiments, the liquid flow measurement system provides a measure of the liquid density to the separator control system 150. This can be used to calibrate the liquid level and flow rate measurements. In some embodiments, the separator control system 150 can be configured to calibrate oil density vial oil level calculations, as described herein.

The separator control system 150 can be configured to return to block 802 until operation ceases, such as through satisfaction of shutdown conditions or a manual shutdown. This allows the separator control system 150 to maintain consistent and efficient operation of the three-phase separator 300 through the operation of the water flow control 320 and the oil flow control 314 and through feedback from the water level sensor 318 and the oil level sensor 312.

Oil Flow Control

Figure 9A:
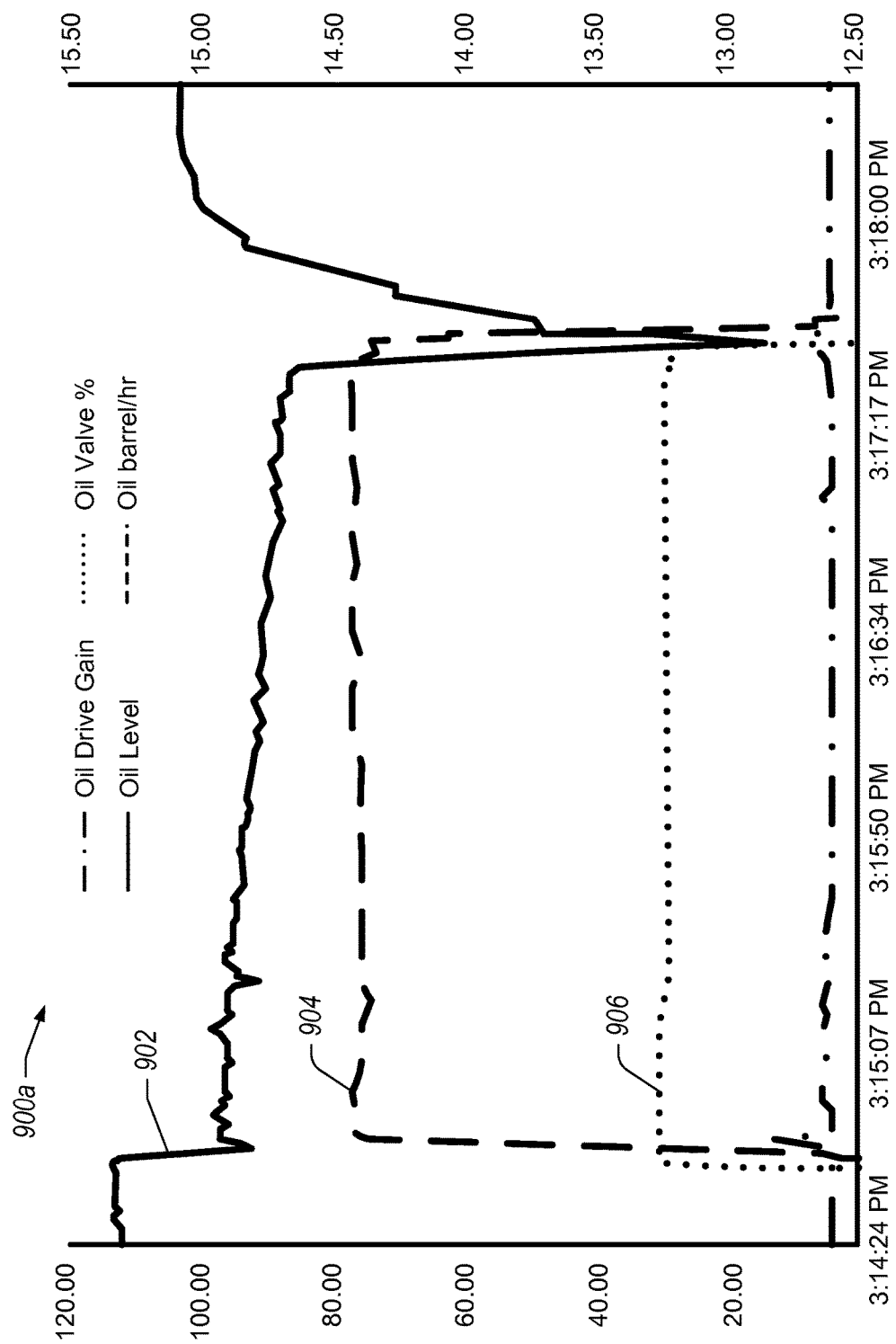
FIGS. 9A and 9B illustrate charts demonstrating effects on oil flow over time for some operating conditions and/or events.
Figure 9B:
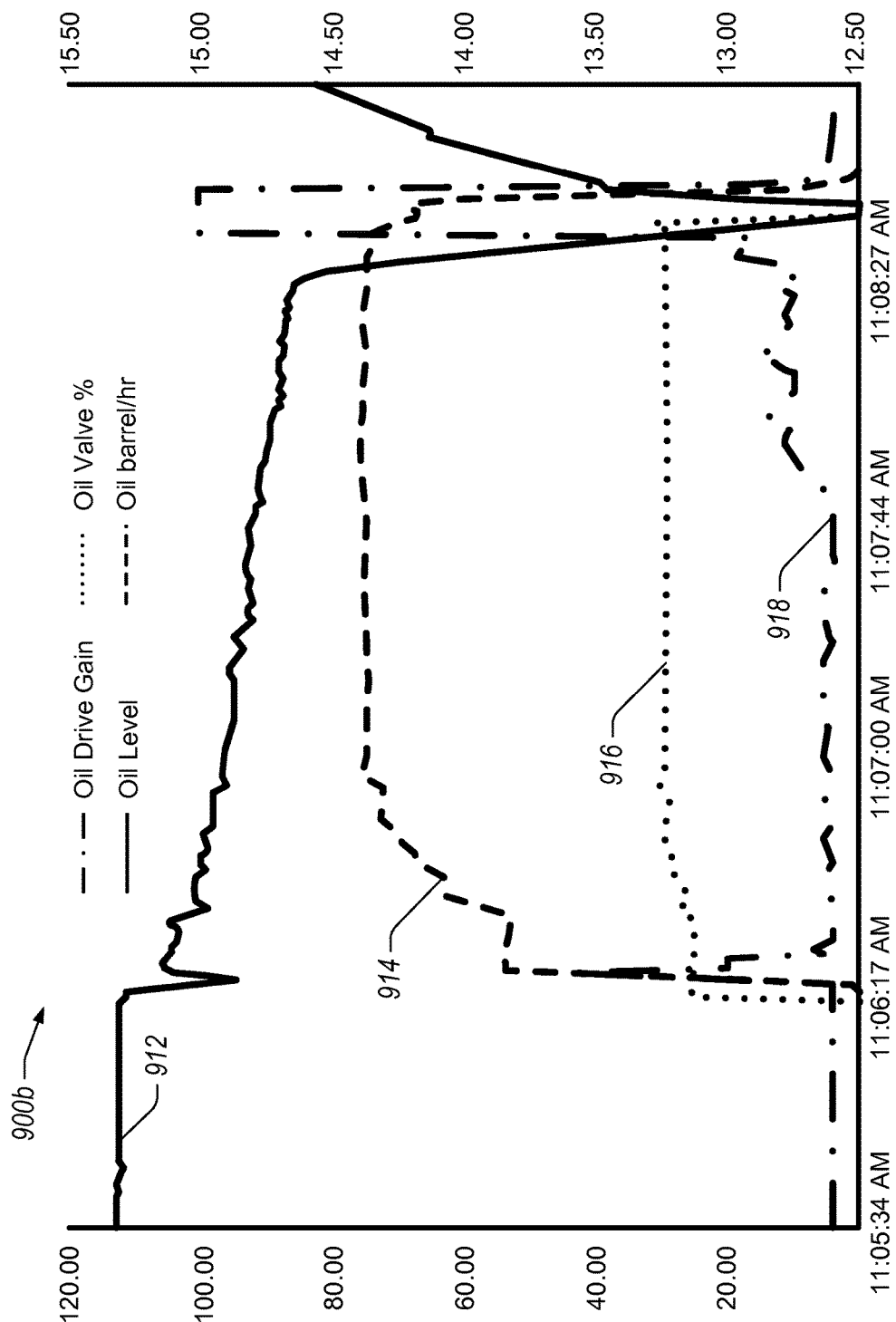

FIGS. 9A and 9B illustrate charts 900a, 900b demonstrating effects on oil flow over time for some operating conditions and/or events. With reference to FIG. 9A, the line 902 represents the oil level in a separator (e.g., a three-phase separator, heater treater, etc.) where the line 902 is plotted against the right axis, which corresponds to the oil level measured in feet. After a steady value, the line 902 drops suddenly and then achieves a relatively steady decline. This corresponds to when the valve opens to dump oil from the separator. The oil level gradually drops as the oil flows out of the separator. The oil outlet can include a flow meter configured to measure the oil flow rate. This is illustrated by line 904 which represents the oil flow rate in barrels per hour, plotted against the left axis. In addition, line 906 represents the commanded valve open position in percentage, plotted against the left axis. When the oil level drops below the oil outlet pipe height, the oil level in the pipe drops relatively quickly. This quick change in oil level can be detected by the separator control system 150 to determine the height of the oil outlet pipe. The separator control system 150 can be configured to monitor this height over time to calibrate the system. For example, the oil density can be calculated using this information.

With reference to FIG. 9B, similar behavior is observed. The line 912 represents the oil level in a separator, plotted against the right axis, which corresponds to the oil level measured in feet. The rate of change of the oil level is not as steady as that illustrated in FIG. 9A. One reason for this is that the oil valve opening changes during the oil dump, as shown by line 916 which represents the commanded valve open position in percentage, plotted against the left axis. The change in commanded valve open position affects the oil flow rate, as shown by the line 914 which represents the oil flow rate measured in barrels per hour, plotted against the left axis. The line 918 represents the drive gain of a flow meter. Drive gain is a measure of the amount of power a transmitter is using to maintain the tubes of the meter resonating, represented as a percent of the total power available to the transmitter. For a given fluid, it takes a certain amount of power to keep the tubes resonating. If the fluid consistency remains constant, the amount of drive gain remains relatively constant. Changes in fluid density and/or the presence of bubbles in the fluid cause changes in the drive gain. As illustrated by line 918, the drive gain significantly increases when the oil level drops below the oil dump pipe height indicating that gas has entered the oil dump pipe. This may be undesirable as it results in inaccurate oil flow rate measurements. The separator control system 150 can be configured to determine the height of the oil outlet so that the valve can be closed prior to the oil level decreasing below the oil outlet, thereby decreasing the risk of having gas enter the oil dump pipe.

As illustrated in FIG. 9B, the separator control system 150 can be configured to monitor the flow rate and/or liquid level of the water and/or oil to control the flow control. The separator control system 150 can use a feedback loop to adjust the opening of the flow control to achieve a targeted liquid level and/or a targeted flow rate.

In some embodiments, a three-phase separator can be configured to impound oil, e.g., save up about 2 barrels of oil in the separator, and then let the oil flow from the separator through the flow meter (e.g., a turbine or Coriolis meter) at a flow rate that is sufficiently high enough to give an accurate reading with that flow meter. Some flow meters may not provide accurate measurements at relatively low flow rates or at the beginning and end of dumps. The impounding of oil can result in a relatively long duration of oil flow at a flow rate which allows the flow meter to provide an accurate measurement. For example, the separator can be allowed to up to about 6-7 in. higher than the oil outlet, then dump the oil until the oil level reaches the outlet height or just above the outlet height, to prevent or reduce the likelihood of sucking gas into the tube oil outlet.

In some embodiments, the separator control system 150 can receive an oil density measurement directly from a flow meter (e.g., a turbine or Coriolis meter) configured to measure the flow rate of oil. The oil density measurement obtained from the flow meter can be used to calibrate the oil height measurement. This may be advantageous where the oil level sensor is placed relatively low in the outlet piping. For example, to achieve about 0.25 in. precision on a 15-foot column of oil in a separator, oil density may vary by about 0.5% that results in a measurement variation of about 0.9 in. By correcting for oil density, the oil level can be determined with relatively high accuracy. The oil density calculation and measurement from the flow meter can be correlated to other methods of determining the oil height. For example, by monitoring the rate of change of oil the height of the oil outlet can be determined, as illustrated in FIGS. 9A and 9B.

Numbered Example Embodiments

The following enumerated embodiments delineate examples of the systems and methods disclosed herein. The following example embodiments are provided for purposes of illustration and are not intended to limit the scope of the systems and methods disclosed herein. Other combinations of features are possible and fall within the scope of the present disclosure.

1. An oil separator system configured to allocate and measure separated oil and water, the oil separator system comprising:

a two-phase separator comprising a liquid level sensor configured to determine a level of liquid in the two-phase separator and a liquid flow control valve configured to control a flow of liquid leaving the two-phase separator;

a three-phase separator coupled to the two-phase separator such that an emulsion comprising oil and water can be flow between the two-phase separator and the three-phase separator, the three-phase separator comprising an oil level sensor, an oil flow control, a water level sensor, a water flow control, and an oil flow measurement system configured to measure a flow of oil from the three-phase separator; and a separator control system comprising a computing hardware, the separator control system configured to:

receive data from the liquid level sensor and adjust the liquid flow control valve based at least in part on the data received from the liquid level sensor;

receive data from the water level sensor and adjust the water flow control valve based at least in part on the data received from the water level sensor;

receive data from the oil level sensor and adjust the oil flow control valve based at least in part on the data received from the oil level sensor; and adjust the flow control valve to achieve an oil flow rate within a targeted range wherein the targeted range comprises a range of oil flow rates at which the oil flow measurement system provides an oil flow measurement within a targeted uncertainty.

2. The system of Embodiment 1 further comprising a water flow measurement system configured to measure a flow of water from the three-phase separator to a water storage.

3. The system of Embodiment 1, wherein the separator control system is further configured to maintain in the three-phase separator an oil level above an oil level threshold.

4. The system of Embodiment 1, wherein the separator control system is further configured to maintain in the three-phase separator a water level above a water level threshold.

5. The system of Embodiment 1, wherein the separator control system is further configured to maintain in the two-phase separator a liquid level above a liquid level threshold.

6. The system of Embodiment 1 further comprising a bridle coupled to the three-phase separator, the bridle configured to receive oil and water from the three-phase separator and to house the received oil and water in a manner that reduces turbulence of the oil and water.

7. The system of Embodiment 6, wherein the bridle is configured to house the water level sensor.

8. The system of Embodiment 1, wherein the water level sensor, the oil level sensor, or the liquid level sensor comprise a differential pressure sensor.

9. The system of Embodiment 1, wherein the water level sensor, the oil level sensor, or the liquid level sensor comprise a capacitance sensor and/or probe.

10. The system of Embodiment 1, wherein the oil flow measurement system or the water flow measurement system comprises a Coriolis flow meter.

11. A two-phase separator retrofit to include automatic control systems, the two-phase separator comprising:
    a tank configured to store gas and a mixture of oil and water;
    an inlet pipe configured to receive a mixture of gas, oil and water and deposit the mixture into the tank;
    a gas outlet pipe configured to carry separated gas from the tank;
    a liquid outlet pipe configured to carry separated liquid from the tank, the separated liquid comprising a mixture of oil and water;
    a liquid level sensor configured to acquire measurements corresponding to a level of the separated liquid in the tank;
    a mechanical valve configured to open when the separated liquid is above a first liquid level and to close when the separated liquid is below a second liquid level, the second liquid level lower than the first liquid level;
    a separator control system; and
    a liquid flow control comprising an actuatable valve coupled to the separator control system,
    wherein the separator control system is configured to receive data from the liquid level sensor to control the liquid flow control,
    wherein the separator control system is configured to maintain the liquid level above the first liquid level during operation.

12. The two-phase separator of Embodiment 11, wherein the liquid level sensor comprises a differential pressure transmitter.

13. The two-phase separator of Embodiment 11, wherein the actuatable valve comprises an electrically or pneumatically actuated valve.

14. The two-phase separator of Embodiment 11, wherein the liquid level sensor, the liquid flow control, and the separator control system are added to an existing two-phase separator to add automatic control capabilities to the two-phase separator.

15. The two-phase separator of Embodiment 11, wherein the separator control system controls the liquid flow control using a feedback loop that determines whether to adjust the liquid flow control based at least in part on data received in real-time from the liquid level sensor and data previously received from the liquid level sensor.

16. The two-phase separator of Embodiment 11, wherein the liquid flow control is configured to remain open when the separator control system or the liquid flow control is in an error or failure condition.

17. A three-phase separator retrofit to include automatic control systems, the three-phase separator comprising:
    a tank configured to store gas, oil and water;
    an inlet pipe configured to receive a mixture of gas, oil and water and deposit the mixture into the tank;
    a gas outlet pipe configured to carry separated gas from the tank;
    an oil outlet pipe configured to carry separated oil from the tank;
    a water outlet pipe configured to carry separated water from the tank;
    an oil level sensor configured to acquire measurements corresponding to a level of the separated oil in the tank;
    a mechanical valve configured to open when the separated oil is above a first oil level and to close when the separated oil is below a second oil level, the second oil level lower than the first oil level;
    a separator control system;
    an oil flow control comprising an actuatable valve coupled to the separator control system; and
    an oil flow measurement system configured to acquire measurements corresponding to a flow of oil from the tank,
    wherein the separator control system is configured to receive data from the oil level sensor to control the oil flow control,
    wherein the separator control system is configured to maintain the oil level above the first oil level during operation.

18. The three-phase separator of Embodiment 17, wherein the oil level sensor comprises a differential pressure transmitter.

19. The three-phase separator of Embodiment 17, wherein the actuatable valve comprises an electrically or pneumatically actuated valve.

20. The three-phase separator of Embodiment 17, wherein the oil level sensor, the oil flow control, and the separator control system are added to an existing three-phase separator to add automatic control capabilities to the three-phase separator.

21. The three-phase separator of Embodiment 17, wherein the separator control system controls the oil flow control using a feedback loop that determines how to adjust the oil flow control based at least in part on data received in real-time from the oil level sensor and data previously received from the oil level sensor.

22. The three-phase separator of Embodiment 17, wherein the oil flow control is configured to remain open when at least one of the separator control system or the oil flow control is in an error or failure condition.

23. The three-phase separator of Embodiment 17, wherein the separator control system is further configured to adjust the oil flow control to achieve an oil flow rate within a targeted range wherein the targeted range comprises a range of oil flow rates at which the oil flow measurement system provides an oil flow measurement within a targeted uncertainty.

24. The three-phase separator of Embodiment 17, wherein the separator control system is further configured to adjust the oil flow control based at least in part on data received from the oil flow measurement system.

25. The three-phase separator of Embodiment 17 further comprising a water level sensor and a water flow control comprising an actuatable valve.

26. The three-phase separator of Embodiment 17 further comprising a water flow measurement system configured to measure a flow of water from the tank.

27. The three-phase separator of Embodiment 17, wherein the separator control system is configured to receive data from the water level sensor to control the water flow control, wherein the separator control system is configured to maintain the water level above a threshold water level during operation.

28. A separator control system configured to control a flow of gas and liquid in a separator, the system comprising:
a hardware processor in communication with a liquid level sensor, a flow control, and a flow measurement system, wherein the hardware processor is configured to execute computer-executable instructions to at least:
receive liquid level sensor data from the liquid level sensor and flow measurement data from the flow measurement system;
adjust the flow control based at least in part on the received liquid level data and the flow data;
control a flow of liquid such that the flow rate is within a targeted flow rate range, the targeted flow rate range configured such that measurements derived from the flow data are within a targeted uncertainty; and
maintain a liquid level above a liquid level threshold, the liquid level threshold configured such that a mechanical valve configured to control liquid flow remains open when the liquid level is above the liquid level threshold.

29. The system of Embodiment 28, wherein the separator control system is further configured to determine an oil density and adjust control of the flow control based at least in part on the oil density.

30. The system of Embodiment 29, wherein the oil density is provided by the flow measurement system.

31. The system of Embodiment 29, wherein the flow measurement system comprises a Coriolis flow meter.

32. The system of Embodiment 28, wherein the flow control comprises a ball valve.

33. The system of Embodiment 32, wherein the separator control system is configured to open and close the ball valve to clean the valve.

34. The system of Embodiment 28, wherein the separator control system is further configured to generate a notification or alarm when the liquid level exceeds a liquid level alarm threshold.

35. The system of Embodiment 28, wherein the separator control system is configured to open the flow control to flush a liquid outlet pipe.

Terminology

Many variations on the oil separation system described above are possible. For example, while the above description generally describes functions as performed by the separator control system 150, at least some of those functions can be performed by a similar control system or group of control systems.

As described above, the separator control system can be implemented with a combination of hardware components such as sensors and valves and one or more physical computing machines, such as a single computing device having a single loop controller or a programmable logic controller or several computing machines having similar controllers or processors interconnected via a network. Thus, each of the components depicted in the separator control system can include hardware and/or software for performing various features.

The processing of the various inputs of the separator control system can be distributed across multiple machines, networks, and other computing resources. Moreover, in some embodiments the connections between the components shown represent possible paths of data flow, rather than actual connections between hardware. While some examples of possible connections are shown, any of the subset of the components shown can communicate with any other subset of components in various implementations. In some embodiments, a separator control system of a type as disclosed herein can be combined in a system of one or more other types of control systems, such as a well-site control system. A central processor and/or database can combine level and flow measurements from multiple sources for analysis or display.

In some embodiments, the separator control system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, a computing system that has components including a central processing unit (CPU), input/output (I/O) components, storage, and memory may be used to execute the separator control system 150, or specific components of the oil separation system. The executable code modules of the separator control system 150 can be stored in the memory of the computing system and/or on other types of non-transitory computer-readable storage media. In some embodiments, the separator control system 150 may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A three-phase separator retrofit to include automatic control systems, the three-phase separator comprising:
    a tank configured to store gas, oil and water;
    an inlet pipe configured to receive a mixture of gas, oil and water and deposit the mixture into the tank;
    a gas outlet pipe configured to carry separated gas from the tank;
    an oil outlet pipe configured to carry separated oil from the tank;
    a water outlet pipe configured to carry separated water from the tank;
    an oil level sensor configured to acquire measurements corresponding to a level of the separated oil in the tank;
    a mechanical valve configured to open when the separated oil is above a first oil level and to close when the separated oil is below a second oil level, the second oil level lower than the first oil level;
    a separator control system;
    an oil flow control comprising an actuatable valve coupled to the separator control system; and
    an oil flow measurement system configured to acquire measurements corresponding to a flow of oil from the tank,
    wherein the separator control system is configured to receive data from the oil level sensor to control the oil flow control,
    wherein the separator control system is configured to maintain the oil level above the first oil level during operation.

2. The three-phase separator of claim 1, wherein the oil level sensor, the oil flow control, and the separator control system are added to an existing three-phase separator to add automatic control capabilities to the three-phase separator.

3. The three-phase separator of claim 1, wherein the separator control system controls the oil flow control using a feedback loop that determines how to adjust the oil flow control based at least in part on data received in real-time from the oil level sensor and data previously received from the oil level sensor.

4. The three-phase separator of claim 1, wherein the separator control system is further configured to adjust the oil flow control to achieve an oil flow rate within a targeted range wherein the targeted range comprises a range of oil flow rates at which the oil flow measurement system provides an oil flow measurement within a targeted uncertainty.

5. The three-phase separator of claim 1, wherein the separator control system is further configured to adjust the oil flow control based at least in part on data received from the oil flow measurement system.

6. The three-phase separator of claim 1 further comprising a water level sensor and a water flow control comprising an actuatable valve.

7. The three-phase separator of claim 1 further comprising a water flow measurement system configured to measure a flow of water from the tank.

8. The three-phase separator of claim 1, wherein the separator control system is configured to receive data from the water level sensor to control the water flow control, wherein the separator control system is configured to maintain the water level above a threshold water level during operation.

* * * * *